(12) United States Patent
Han et al.

(10) Patent No.: US 8,599,184 B2
(45) Date of Patent: Dec. 3, 2013

(54) CHARGE PUMP AND DISPLAY DRIVING SYSTEM INCLUDING THE SAME

(75) Inventors: Byung-hun Han, Seoul (KR); Sung-jin Park, Seoul (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 649 days.

(21) Appl. No.: 12/815,520

(22) Filed: Jun. 15, 2010

(65) Prior Publication Data

US 2011/0115834 A1    May 19, 2011

(30) Foreign Application Priority Data

Nov. 13, 2009   (KR) .................. 10-2009-0109691

(51) Int. Cl.
*G09G 5/00* (2006.01)
(52) U.S. Cl.
USPC .......................................... 345/211; 327/536
(58) Field of Classification Search
USPC ............ 345/211–213; 327/157, 536; 257/299
See application file for complete search history.

(56) References Cited

U.S. PATENT DOCUMENTS

| | | | |
|---|---|---|---|
| 5,410,465 A | 4/1995 | Tan | |
| 5,422,586 A | 6/1995 | Tedrow | |
| 5,493,249 A | 2/1996 | Manning | |
| 6,922,097 B2 | 7/2005 | Chan | |
| 2005/0206635 A1* | 9/2005 | Hashimoto | 345/204 |
| 2005/0258810 A1* | 11/2005 | Lin | 323/282 |
| 2008/0157857 A1* | 7/2008 | Fujiwara | 327/536 |

* cited by examiner

*Primary Examiner* — Allison Walthall
(74) *Attorney, Agent, or Firm* — Harness, Dickey & Pierce, P.L.C.

(57) ABSTRACT

Provided is a boosting voltage generating element used in a semiconductor integrated circuit, more particularly, is a charge pump. The charge pump includes a first converting unit and a second converting unit. The first converting unit is configured to receive a first voltage in response to a first clock signal to generate a first pumping voltage. The first converting unit is also configured to alternately output the first pumping voltage to a first terminal and a second terminal. The second converting unit is configured to receive the first pumping voltage through the first terminal or the second terminal in response to a second clock signal and a third clock signal respectively, to generate a second pumping voltage The second converting unit is also configured to provide the second pumping voltage to an output terminal. The second converting unit is configured to provide the second pumping voltage to the output terminal for at least half of a period of the second clock signal or the third clock signal.

18 Claims, 17 Drawing Sheets

CHARGE PUMP AND DISPLAY DRIVING SYSTEM INCLUDING THE SAME

CROSS-REFERENCE TO RELATED APPLICATIONS

This U.S. non-provisional application claims priority under 35 U.S.C. §119 to Korean Patent Application No. 10-2009-0109691, filed on Nov. 13, 2009, in the Korean Intellectual Property Office (KIPO), the entire contents of which are hereby incorporated herein by reference.

BACKGROUND

1. Field

Example embodiments of the inventive concepts relate to a boosting voltage generating technology. More particularly, example embodiments relate to a charge pump used in a semiconductor integrated circuit and a display driving system including the charge pump.

2. Description of Conventional Art

Many circuits requiring a high operational voltage may exist in a semiconductor integrated circuit. If circuits which are used with a device requiring a high operating voltage or which require a high operating voltage exist in a semiconductor integrated circuit, it may be necessary to generate a voltage higher than a power voltage in the integrated circuit. Charge pumps are boosting devices that use capacitors and perform based on the law of conversation of electric charge. Charge pumps that are configured to generate a voltage higher than a supplied power voltage are widely used in electronic devices, such as memories, flat panel displays, etc. Nonvolatile memories, such as electrically erasable programmable read only memories (EEPROMs) and flash memories, use a high voltage to read and write data, and flat panel displays use a high voltage to drive an organic light emitting diode (OLED) or a thin film transistor (TFT)-liquid crystal display (LCD).

In order for a charge pump to be applied to a mobile display driving circuit, a high driving current is needed. Since a higher voltage is also needed, the charge pump increasing a voltage from a lower supplied power voltage is needed. Also, since power is supplied from a portable battery, power efficiency is very important. In general, charge pumps receive a phase (or clock) signal that is an operation reference signal to boost a voltage using a capacitor. Then, the charge pumps send the boosted voltage to an output terminal through a switch. The output terminal may suffer from current consumption due to an external load connected to the output terminal. The output terminal may also suffer from current consumption because an output voltage is decreased from the boosted voltage if the current consumption is increased. Accordingly, charge pumps should be designed to constantly supply a boosted voltage despite current consumption.

SUMMARY

Example embodiments of the inventive concepts provide a charge pump having improved current driving capability.

According to an embodiment of the inventive concepts, there is provided a display driving system including a charge pump having improved current driving capability.

According to another embodiment of the inventive concepts, there is provided a charge pump including. The charge pump includes a first converting unit configured to receive a first voltage in response to a first clock signal to generate a first pumping voltage. The first converting unit may also be configured to alternately output the first pumping voltage to a first terminal and a second terminal. The charge pump may also include a second converting unit configured to receive the first pumping voltage through the first terminal or the second terminal in response to a second clock signal and a third clock signal respectively, to generate a second pumping voltage. The second converting unit may also be configured to provide the second pumping voltage to an output terminal, wherein the second converting unit is configured to provide the second pumping voltage to the output terminal for at least half of a period of the second clock signal or the third clock signal.

According to another aspect of the present invention, there is provided a display driving system including. The display may include a display panel having a plurality of scan lines and a plurality of data lines vertically intersecting each other and switching elements and pixel electrodes arranged at intersections between the plurality of scan lines and the plurality of data lines. The display driving system may include a scan driving unit configured to provide a scan signal to the plurality of scan lines of the display panel. The display driving system may include a data driving unit configured to provide gradation information to the plurality of data lines of the display panel. The display driving system may further include a timing controller configured to scan driving unit and the data driving unit. The display driving system may also include a charge pump configured to provide a driving voltage to at least one of the display panel, the scan driving unit, the data driving unit, and the timing controller. The charge pump may include a first converting unit configured to receive a first voltage in response to a first clock signal to generate a first pumping voltage. The first converting unit is also configured to alternately output the first pumping voltage to a first terminal and a second terminal. The charge pump includes a second converting unit configured to receive the first pumping voltage through the first terminal or the second terminal in response to a second clock signal and a third clock signal respectively, to generate a second pumping voltage. The second converting unit is configured to provide the second pumping voltage to an output terminal, wherein the second converting unit is configured to provide the third voltage to the output terminal for half of a period of the second clock signal and for half of a period of the third clock signal.

BRIEF DESCRIPTION OF THE DRAWINGS

Exemplary embodiments of the inventive concepts will be more clearly understood from the following detailed description taken in conjunction with the accompanying drawings in which.

DETAILED DESCRIPTION OF THE EMBODIMENTS

Figure 1A:
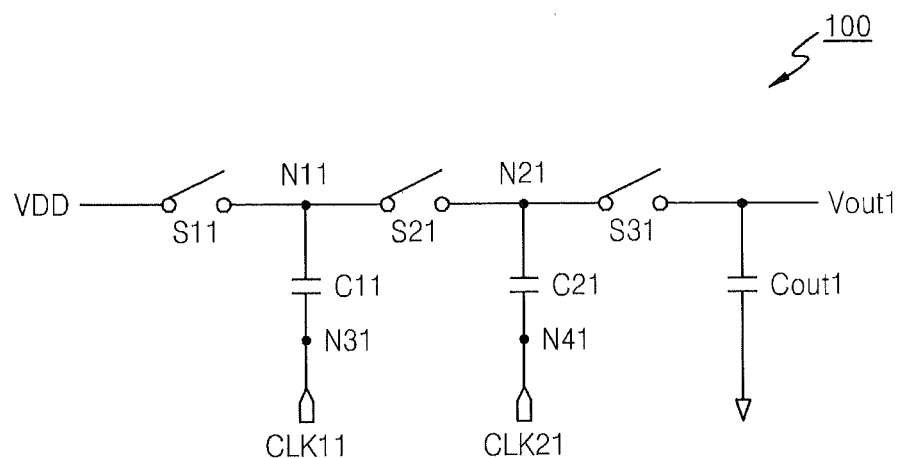
FIG. 1A is a circuit diagram of a charge pump which outputs a voltage that is 3 times higher than a power voltage.

Example embodiments of inventive concepts will now be described more fully with reference to the accompanying drawings. However, example embodiments may be embodied in many different forms and should not be construed as being limited to the example embodiments set forth herein. Example embodiments are provided so that this disclosure will be thorough, and will fully convey the scope to those who are skilled in the art. In some example embodiments, well-known processes, well-known device structures, and well-known technologies are not described in detail to avoid the unclear interpretation of the example embodiments. Throughout the specification, like reference numerals in the drawings denote like elements.

It will be understood that when an element or layer is referred to as being "on", "connected to" or "coupled to" another element or layer, it may be directly on, connected or coupled to the other element or layer, or intervening elements or layers may be present. In contrast, when an element is referred to as being "directly on," "directly connected to" or "directly coupled to" another element or layer, there may be no intervening elements or layers present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Thus, a first element, component, region, layer or section discussed below could be termed a second element, component, region, layer or section without departing from the teachings of the example embodiments.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises", "comprising", "includes", and/or "including" if used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
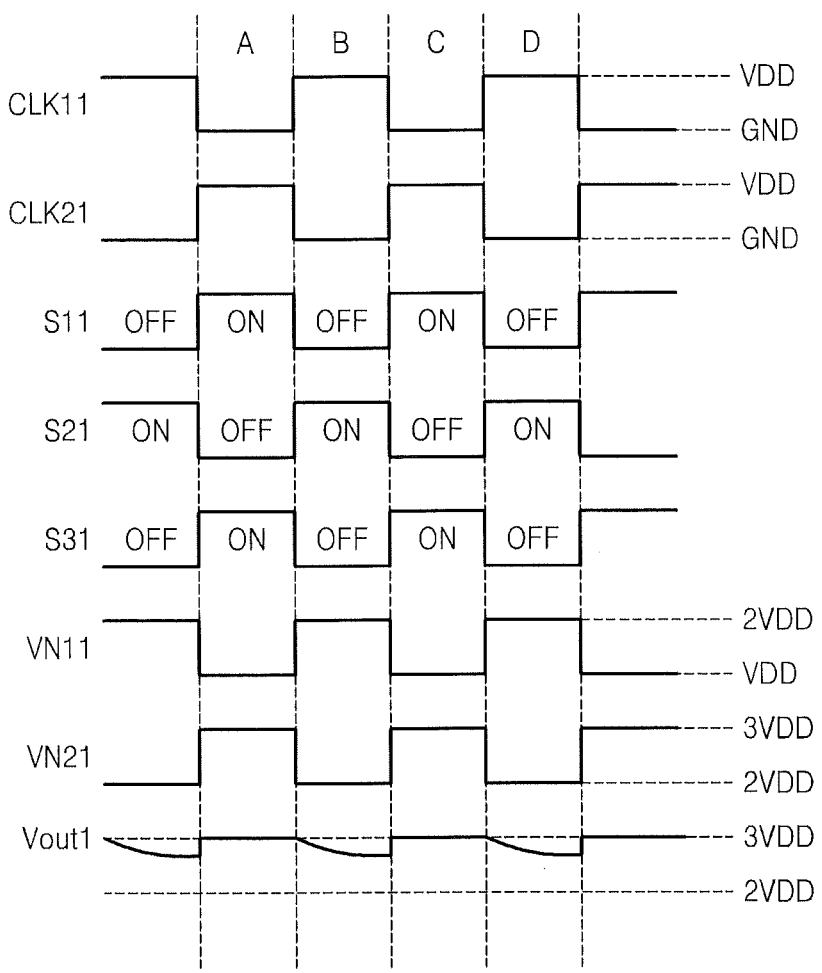
FIG. 1B is a timing diagram illustrating the operation of the charge pump of FIG. 1A in a steady state.

FIG. 1A is a circuit diagram of a charge pump 100 which outputs a voltage that is 3 times higher than a power voltage VDD. FIG. 1B is a timing diagram illustrating the operation of the charge pump 100 of FIG. 1A in a steady state.

Referring to FIGS. 1A and 1B, the charge pump 100 includes three switches S11, S21, and S31, two pumping capacitors C11 and C21, and an output capacitor Cout1 between an output terminal and a ground. A clock signal CLK11 alternating between a power voltage VDD and a ground voltage GND is applied to an N31 terminal. A clock signal CLK21 alternating between the power voltage VDD and the ground voltage GND is applied to an N41 terminal. The clock signal CLK11 and the clock signal CLK21 have opposite phases. The charge pump 100 may generate a desired output voltage up to 3VDD as the switches S11 through S31 are turned on/off at desired or predetermined points of time.

During a steady state, such as in interval A, since the clock signal CLK11 is at a lower level (GND) and the switch S11 is turned on, a potential of the N11 terminal is the power voltage VDD. Also during interval A, a potential of the N31 terminal is the ground voltage GND so that the pumping capacitor C11 is charged to the power voltage VDD. In interval B, if the clock signal CLK11 is at a higher level (VDD), the switch S11 is turned off, the switch S21 is turned on, and the clock signal CLK21 is at a lower level (GND), then the potential of the N31 terminal changes from the ground voltage GND to the power voltage VDD. Also, the voltage of the N11 terminal is boosted from the ground voltage VDD to 2VDD due to capacitor coupling effect. If the switch S21 is turned on, a potential of the N21 terminal becomes 2VDD, the N41 terminal is grounded due to the clock signal CLK21 that is at a low level (GND), and the pumping capacitor C21 is charged to 2VDD. In interval C, the clock signal CLK21 is at a high level (VDD), the potential of the N41 terminal changes from the ground to the power voltage VDD. Also, the potential of the N21 terminal is boosted from 2VDD to 3VDD due to capacitor coupling effect. Additionally, in interval C the switch S31 is turned on, the potential 3VDD of the N21 terminal is transmitted to the output terminal, an output voltage Vout1 becomes 3VDD, and the output capacitor Cout1 is charged to 3VDD. Accordingly, 3VDD is obtained using the power voltage VDD.

Figure 2:
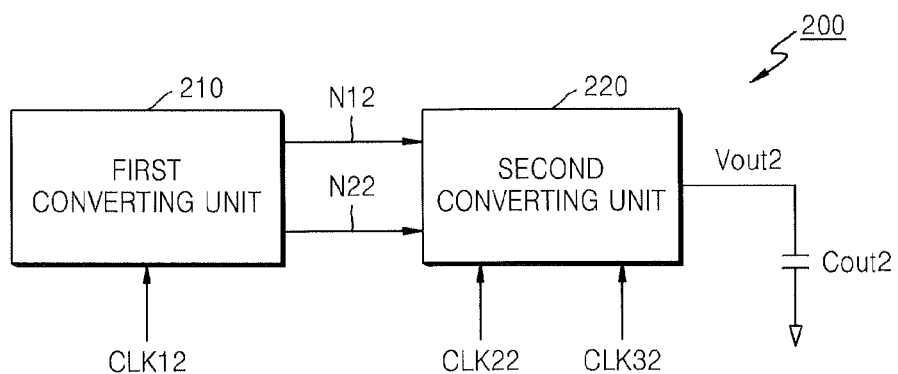
FIG. 2 is a block diagram of a charge pump according to an embodiment of the inventive concepts.

FIG. 2 is a block diagram of a charge pump 200 according to an embodiment of the inventive concepts.

Referring to FIG. 2, the charge pump 200 includes a first converting unit 210 and a second converting unit 220. The first converting unit 210 converts a power voltage VDD in response to a clock signal CLK12 to generate a first pumping voltage. Also, the first converting unit 210 alternately outputs the first pumping voltage to an N12 terminal and to an N22 terminal. The second converting unit 220 converts the first pumping voltage provided through the N12 terminal or the N22 terminal in response to a clock signal CLK22 or a clock signal CLK32 to generate a second pumping voltage. Also, the second converting unit 220 provides the second pumping voltage to an output terminal. If the clock signals CLK22 and CLK32 have opposite phases, the second pumping voltage is provided to the output terminal Vout2 in response to the clock signal CLK22 for one half of a period of the clock signal CLK22. For the other half period, the second pumping voltage is provided to the output terminal in response to the clock signal CLK32. The second converting unit 220 responds to clock signals CLK22 and CLK32 so that the charge pump 200 can charge an output capacitor Cout2 for one clock signal period, thereby improving current driving capability of the charge pump 200.

Figure 3:
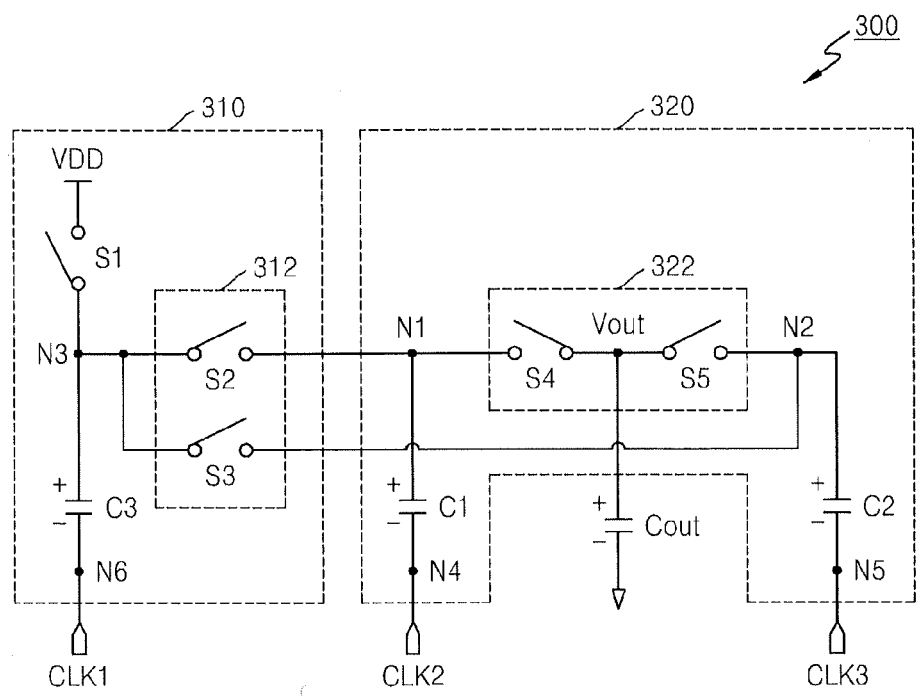
FIG. 3 is a circuit diagram of a positive charge pump according to an embodiment of the inventive concepts.

FIG. 3 is a circuit diagram of a positive charge pump 300 according to an embodiment of the inventive concepts.

Referring to FIG. 3, a positive charge pump 300 includes a first converting unit 310 and a second converting unit 320.

The first converting unit 310 includes a switch Si providing a power voltage VDD to a terminal N3, and a pumping capacitor C3 having a first terminal to which the N3 terminal is connected. The first converting unit 310 also includes a second terminal N6 to which a clock signal CLK1 is applied. Furthermore, the first converting unit 310 includes a first transmitting unit 312 transmitting a potential of the N3 terminal to an N1 terminal or an N2 terminal. The first transmitting unit 312 may include switches S2 and S3 respectively transmitting the potential of the N3 terminal to the N1 terminal and the N2 terminal.

The second converting unit 320 includes a pumping capacitor C1 having a first terminal to which the N1 terminal is connected and a second terminal to which a clock signal CLK2 is applied. The second converting unit 320 also includes a pumping capacitor C2 having a first terminal to which the N2 terminal is connected and a second terminal to which a clock signal CLK3 is applied. More so the second converting 320 unit includes a second transmitting unit 322 providing a potential of the N1 terminal or the N2 terminal to an output terminal. The second transmitting unit 322 may include a switch S4 providing the potential of the N1 terminal to the output terminal and a switch S5 transmitting the potential of the N2 terminal to the output terminal Vout. If the clock signals CLK2 and CLK3 have opposite phases and the clock signals CLK1 through CLK3 alternate between a power voltage VDD and a ground voltage GND. Thus, the positive charge pump 300 can generate a voltage up to 3VDD using the power voltage VDD.

More specifically, the first converting unit 310 positively boosts the power voltage VDD to generate a voltage of 2VDD, and the first converting unit 310 transmits the voltage of 2VDD to the second converting unit 320. The second converting unit 320 positively boosts the voltage of 2VDD provided from the first converting unit 310 to generate a voltage of 3VDD. The second converting unit 320 provides the voltage of 3VDD to the output terminal in response to the clock signal CLK2 for one half of a period of the clock signal CLK2. The second converting unit 320 provides the voltage of 3VDD to the output terminal in response to the clock signal CLK3 for the other half of the period of the clock signal CLK2. Accordingly, since the second converting unit 320 can charge an output capacitor Cout to the voltage of 3VDD for one period of the clock signal CLK2 or CLK3, the positive charge pump 300 can generate the voltage of 3VDD that is three times higher than the power voltage VDD, thereby improving current supply capability.

Figure 4:
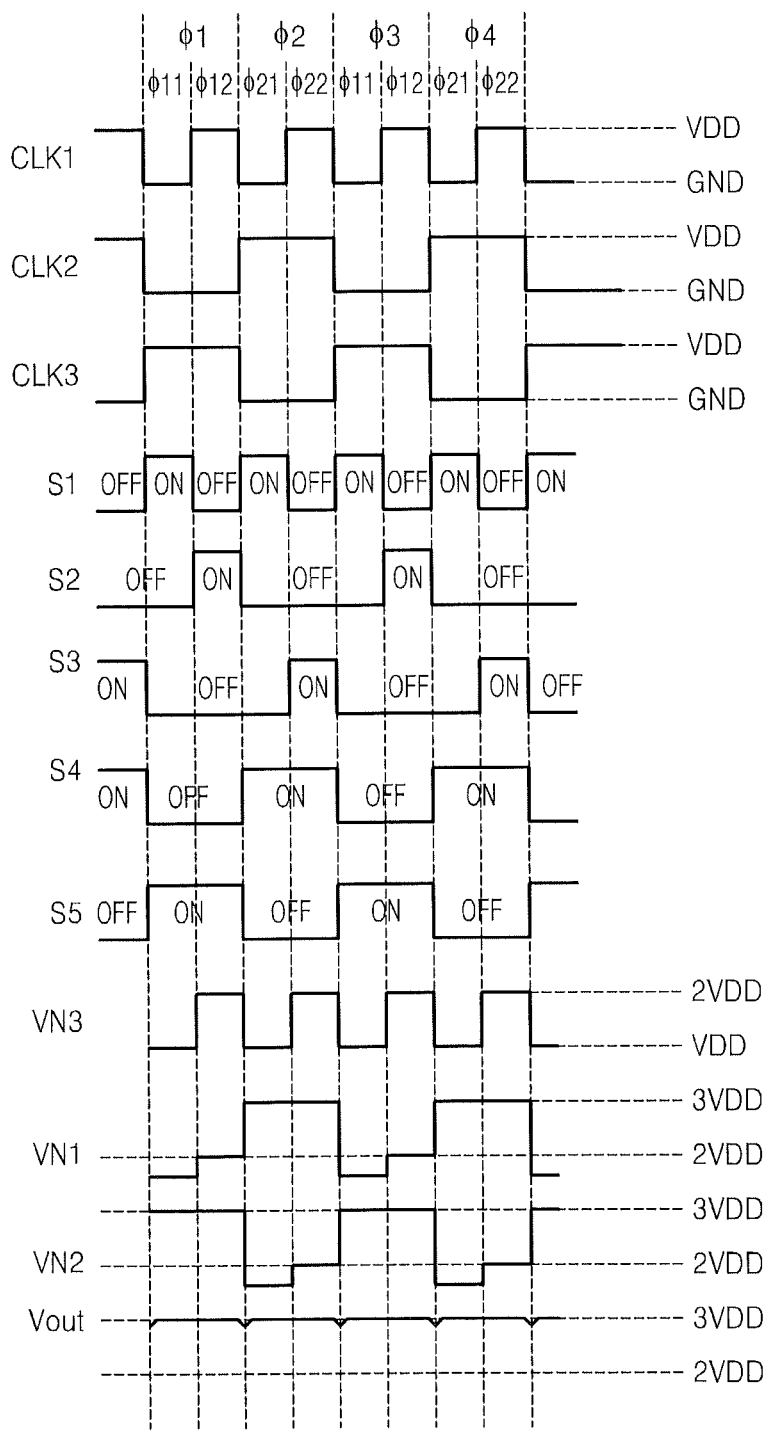
FIG. 4 is a timing diagram illustrating the operation of the positive charge pump of FIG. 3 in a steady state.

FIG. 4 is a timing diagram illustrating the operation of the positive charge pump of FIG. 3 in a steady state.

Referring to FIG. 4, the clock signal CLK1 has a frequency that is two times higher than each of those of the clock signals CLK2 and CLK3. Additionally, the clock signals CLK2 and CLK3 have opposite phases. Also, the clock signals CLK1 through CLK3 change between the power voltage VDD and the ground voltage GND. In this example embodiment, the positive charge pump 300 can generate a voltage of 3VDD that is three times higher than the power voltage VDD.

A process of generating a voltage of 3VDD will now be explained briefly with reference to FIGS. 3 and 4. Explanation will be first made on how the first converting unit 310 boosts the power voltage VDD to obtain a voltage of 2VDD. The first converting unit then may transmit the voltage of 2VDD to the second converting unit 320. In a $\phi 11$ interval, a potential of the N3 terminal is initialized to the power voltage VDD. In a $\phi 12$ interval, the potential of the N3 terminal may be positively boosted to a voltage of 2VDD. The potential VDD of the N3 terminal may be transmitted to the N1 terminal. As a result, the first converting unit 310 boosts the potential of the N3 terminal from the power voltage VDD to the voltage of 2VDD. Then, the first converting unit 310 transmits the voltage of 2VDD to the N1 terminal in a $\phi$ interval consisting of the $\phi 11$ interval and the $\phi 12$ interval. In a $\phi 21$ interval, the potential of the N3 terminal is initialized to the power voltage VDD. In a $\phi 22$ interval, the N3 terminal is positively boosted to a voltage of 2VDD and the potential 2VDD of the N3 terminal is transmitted to the N2 terminal. As a result, the first converting unit 310 positively boosts the potential of the N3 terminal from the power voltage VDD to the voltage of 2VDD and transmits the voltage of 2VDD to the N2 terminal in a $\phi 2$ interval. The $\phi 2$ consisting of the $\phi 21$ interval and the $\phi 22$ interval. Thus, the first converting unit 310 generates a voltage of 2VDD and transmits the voltage of 2VDD to the N1 terminal in the $\phi 1$ interval, and during the $\phi 2$ interval the first converting unit 310 generates a voltage of 2VDD and transmits the voltage of 2VDD to the N2.

Next, explanation will be made on how the second converting unit 320 positively boosts the voltage provided from the first converting unit 310. The second converting unit 320 uses the provided voltage to generate a voltage of 3VDD and provides a voltage of 3VDD to the output terminal. A potential of the N1 terminal is initialized to the received 2VDD from the first converting unit 310 in the φ12 interval. The 2VDD voltage is positively boosted to a voltage of 3VDD and transmitted to the output terminal in the φ2 interval. The φ2 interval consisting of the φ21 interval and the φ22 interval. Also, a potential of the N2 terminal is initialized to the 2VDD voltage received from the first converting unit 310 in the φ22 interval The 2VDD voltage is positively boosted to a voltage of 3VDD and transmitted to the output terminal in the φ1 interval. The φ1 interval consisting of the φ11 interval and the φ12 interval. Thus, the second converting unit 320 boosts the potential of the N1 terminal from the voltage of 2VDD to the voltage of 3VDD and transmits the voltage of 3VDD to the output terminal in the φ2 interval. Also, the second converting unit 320 boosts the potential voltage of the N2 terminal from 2VDD to the 3VDD and outputs the voltage of 3VDD to the output terminal in the φ1 interval. Accordingly, the positive charge pump 300 continuously generates the voltage of 3VDD for one period (φ1+φ2) of the clock signal CLK2 or the clock signal CLK3, and charges the output capacitor Cout.

The operation of the positive charge pump 300 will now be explained in detail with reference to FIGS. 5 through 8.

Figure 5:
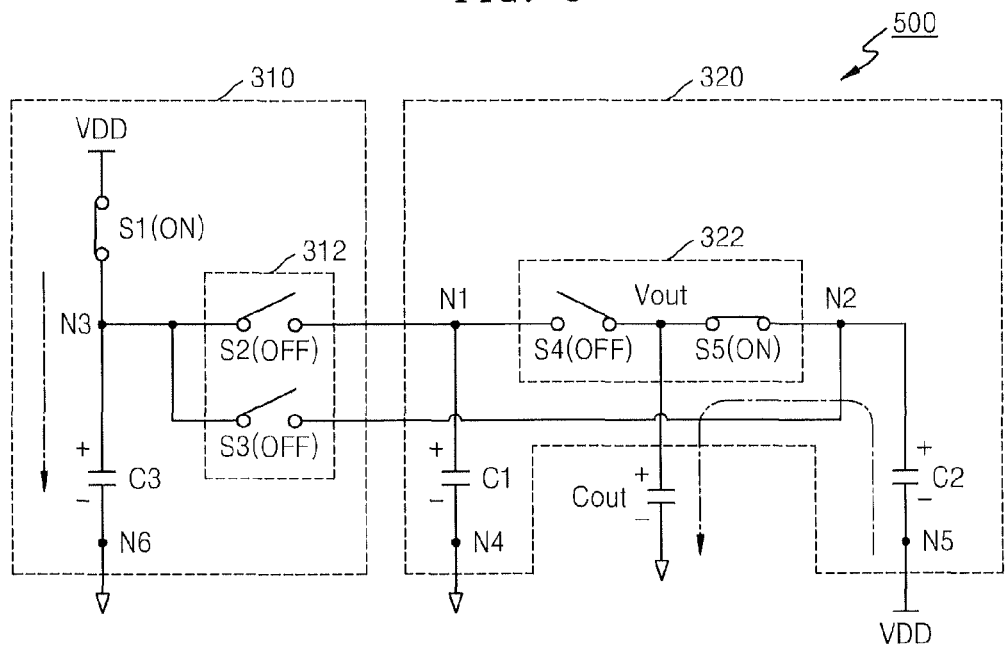
FIG. 5 is a circuit diagram illustrating the operation of the positive charge pump of FIG. 3 in a φ11 interval of FIG. 4.

FIG. 5 is a circuit diagram illustrating the operation of the positive charge pump 300 of FIG. 3 in the φ1 interval of FIG. 4.

Referring to FIG. 5, a voltage stored in the pumping capacitor C3 in the φ11 interval is lower than the power voltage VDD due to a discharge in φ22 interval. At this time, the clock signal CLK1 is at a low level GND and applied to terminal N6.Thus, a potential of an N6 terminal is changed from the power voltage VDD to the ground voltage GND. The switch S1 is turned on to recover a potential voltage of the N3 terminal which is higher than the power voltage VDD due to a discharge to the power voltage VDD. During the φ11 interval, the first converting unit 310 does not transmit the potential of the N3 terminal to the N1 terminal and the N2 terminal because the switches S2 and S3 are turned off. As a result, the pumping capacitor C3 is charged to the power voltage VDD.

A voltage according to the amount of charge stored in the pumping capacitor C1 in the cp 11 interval is lower than a voltage of 2VDD due to a discharge in the φ2 interval. In the φ11 interval, since the clock signal CLK2 is at a low level, a potential of the N4 terminal is changed from the power voltage VDD to the ground voltage GND. As a result, a potential of the N1 terminal is lower than the voltage of 2VDD.

In the φ11 interval, a charge of 2VDD is already stored in the pumping capacitor C2. In the φ11 interval, since the clock signal CLK3 is at a higher level (VDD), a voltage potential of the N5 terminal is changed from the ground voltage GND to the power voltage VDD and a potential of the N2 terminal is positively boosted from the voltage of 2VDD to a voltage of 3VDD due to coupling effect. In the φ11 interval, the second transmitting unit 322 transmits the potential 3VDD of the N2 terminal to the output terminal. That is, the switch S4 is turned off, and the switch S5 is turned on to transmit the potential 3VDD of the N2 terminal to the output terminal, thereby charging the output capacitor Cout.

Figure 6:
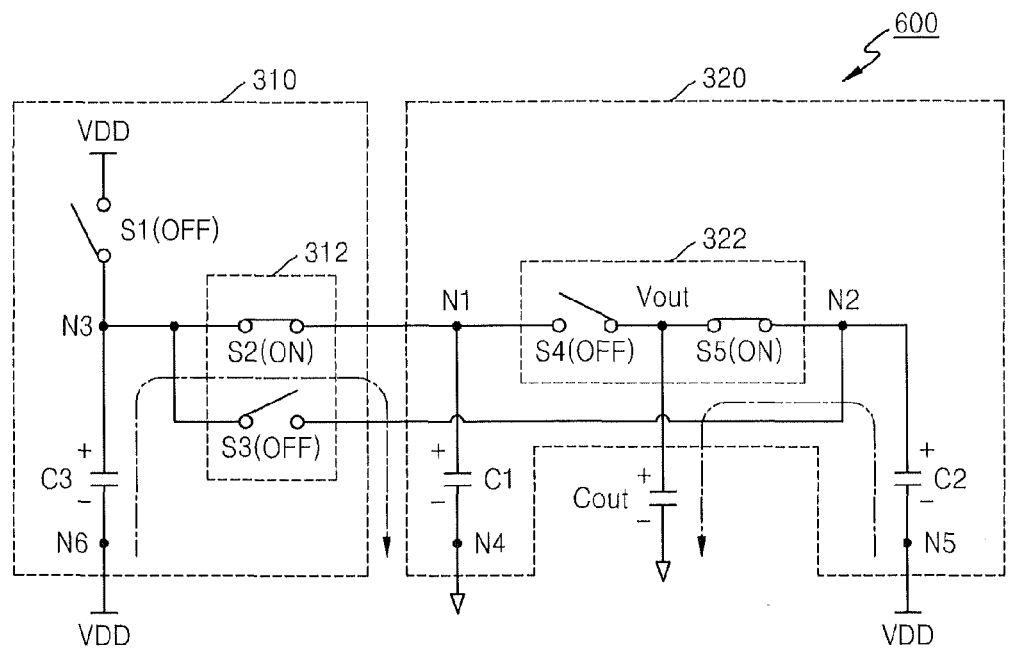
FIG. 6 is a circuit diagram illustrating the operation of the positive charge pump of FIG. 3 in a φ12 interval of FIG. 4.

FIG. 6 is a circuit diagram illustrating the operation of the positive charge pump 300 of FIG. 3 in the φ12 interval of FIG. 4.

Referring to FIG. 6, in the φ12 interval, the pumping capacitor C3 is charged to the power voltage VDD. In the φ12 interval, since the switch S1 is turned off and the clock signal CLK1 is at a high level (VDD), a potential of the N6 terminal is changed from the ground voltage GND to the power voltage VDD. Since the pumping capacitor C3 is already charged to the voltage VDD, a potential of the N3 terminal is positively boosted from the power voltage VDD to a voltage of 2VDD due to capacitor coupling effect. That is, the φ12 interval is an interval in which the first converting unit 310 generates a pumping voltage of 2VDD.

Since the clock signal CLK2 is still at a lower level (GND) in the φ12 interval, a potential voltage of the N4 terminal is maintained at the ground voltage GND. A voltage according to the amount of charge stored in the pumping capacitor C1 is lower than a voltage of 2VDD due to a discharge in the φ2 interval. Accordingly, a potential of the N1 terminal is lower than the 2VDD voltage. In the φ12 interval, the first transmitting unit 312 transmits the potential of the N3 terminal to the N1 terminal. That is, the switch S2 is turned on and the switch S3 is maintained in an off state. Accordingly, the voltage potential of the N1 terminal is lowered due to a discharge in the φ2 interval. However, the voltage potential of the N1 terminal is recovered to the voltage of 2VDD in the φ12 interval. As a result, the pumping capacitor C1 is charged to the voltage of 2VDD.

Since the clock signal CLK3 is still at a higher level (VDD) in the p 12 interval, a potential of the N5 terminal is maintained at the power voltage VDD. In the φ12, the second transmitting unit 322 still transmits a potential of the N2 terminal to the output terminal. That is, since the switch S4 is turned off and the switch S5 is turned on, the potential of the N2 terminal can be transmitted to the output terminal, thereby charging the output capacitor Cout.

Figure 7:
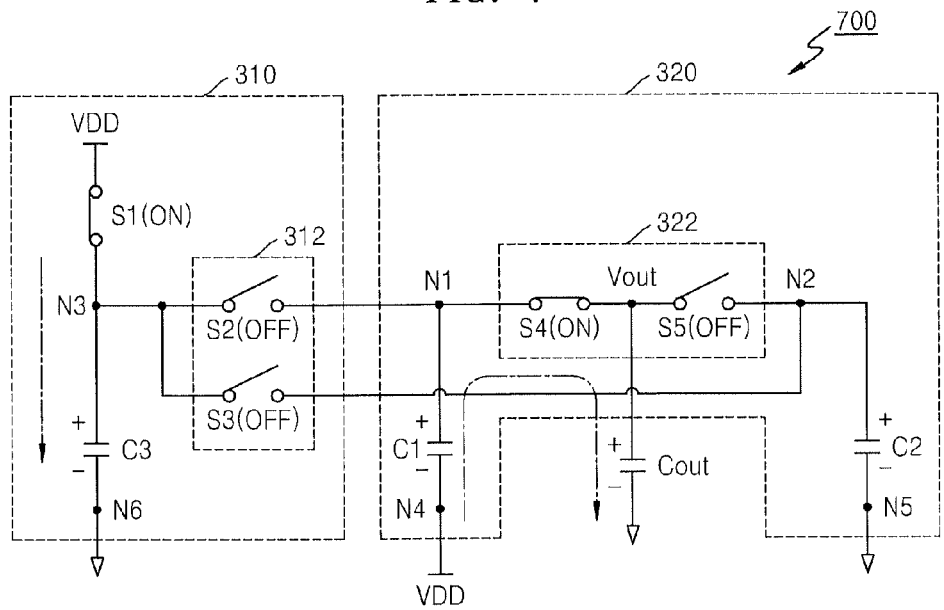
FIG. 7 is a circuit diagram illustrating the operation of the positive charge pump of FIG. 3 in a φ21 interval of FIG. 4.

FIG. 7 is a circuit diagram illustrating the operation of the positive charge pump 300 of FIG. 3 in the φ21 interval of FIG. 4.

Referring to FIG. 7, in the φ21 interval a charge voltage stored in the pumping capacitor C3 is lower than the power voltage VDD due to a discharge in the φ12 interval. In the φ21 interval, the clock signal CLK1 is at a lower level (GND) and is applied to the terminal N6.A potential voltage of the N6 terminal is changed from the power voltage VDD to the ground voltage GND. In the φ21 interval, the switch 51 is turned on to recover a potential voltage of the N3 terminal which is lower than the power voltage VDD due to a discharge to the power voltage VDD. Also in the φ21 interval, the first transmitting unit 312 does not transmit the potential of the N3 terminal to either the N1 terminal or the N2 terminal. That is, the switch S2 is turned off and the switch S3 is still in an off state. As a result, the pumping capacitor C3 is charged to the power voltage VDD again.

In the φ21 interval a charge voltage of 2VDD is already stored in the pumping capacitor C1 Since the clock signal CLK2 is at a higher level (VDD) in the φ21 interval, a potential of the N4 terminal is changed from the ground voltage GND to the power voltage VDD. Accordingly, a potential of the N1 terminal is positively boosted from a voltage of 2VDD to a voltage of 3VDD due to capacitor coupling effect. At this time, the second transmitting unit 322 transmits the potential 3VDD of the N1 terminal to the output terminal. That is, the switch S4 is turned on, the switch S5 is turned off, and the potential 3VDD of the N1 terminal is transmitted to the output terminal, thereby charging the output capacitor Cout.

A voltage according to the amount of charge stored in the pumping capacitor C2 in the φ21 interval is lower than a voltage of 2VDD due to a discharge in the φ1 interval. Since the clock signal CLK3 is at a lower level (GND), a potential of the N5 terminal is changed from the power voltage VDD to the ground voltage GND. As a result, the potential of the N2 terminal is lower than the voltage of 2VDD.

Figure 8:
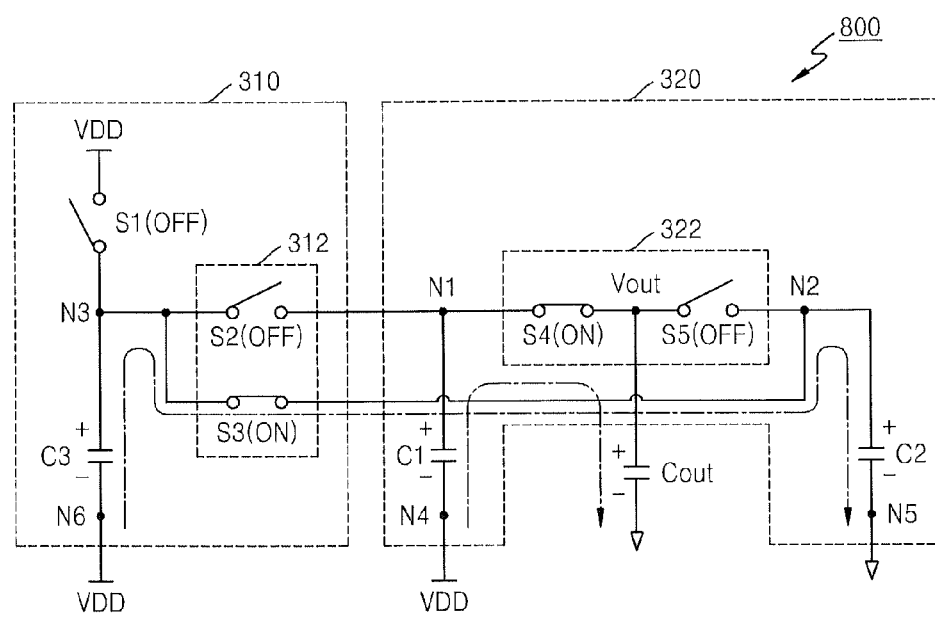
FIG. 8 is a circuit diagram illustrating the operation of the positive charge pump of FIG. 3 in a φ22 interval of FIG. 4.

FIG. 8 is a circuit diagram illustrating the operation of the positive charge pump 300 of FIG. 3 in the φ22 interval of FIG. 4.

Referring to FIG. 8, the pumping capacitor C3 is charged to the power voltage VDD in the φ22 interval. At this time, since the switch Si is turned off and the clock signal CLK1 is at a higher level (VDD), a potential of the N6 terminal is changed from the ground voltage GND to the power voltage VDD. Since the pumping capacitor C3 is already charged to the power voltage VDD, a voltage potential of the N3 terminal is positively boosted from the power voltage VDD to a voltage of 2VDD due to capacitor coupling effect. That is, during the φ22 interval the first converting unit 310 generates a pumping voltage of 2VDD, similar to the φ12 interval.

Since the clock signal CLK2 is still at a higher level (VDD) in the φ22 interval, a potential of the N4 terminal is maintained at the power voltage VDD. The second transmitting unit 322 transmits a potential of the N1 terminal to the output terminal. Since the switch S4 is turned on and the switch S5 is turned off, the potential of the N1 terminal is transmitted to the output terminal, thereby charging the output capacitor Cout.

Since the clock signal CLK3 is still at a lower level (GND) in the φ22 interval, a potential of the N5 terminal is maintained at the ground voltage GND. A charge voltage stored in the pumping capacitor C2 is lower than a voltage of 2VDD due to a discharge in the φ1 interval. Accordingly, a potential of the N2 terminal is lower than the voltage of 2VDD. In the φ22, the first transmitting unit 312 transmits the potential 2VDD of the N3 terminal to the N2 terminal. That is, the switch S2 is still turned off and the switch S3 is turned on. Accordingly, the voltage potential of the N2 terminal which is lower than the voltage of 2VDD due to a discharge is recovered to the voltage of 2VDD in the φ22 interval. As a result, the pumping capacitor C2 is charged to the voltage of 2VDD.

Figure 9:
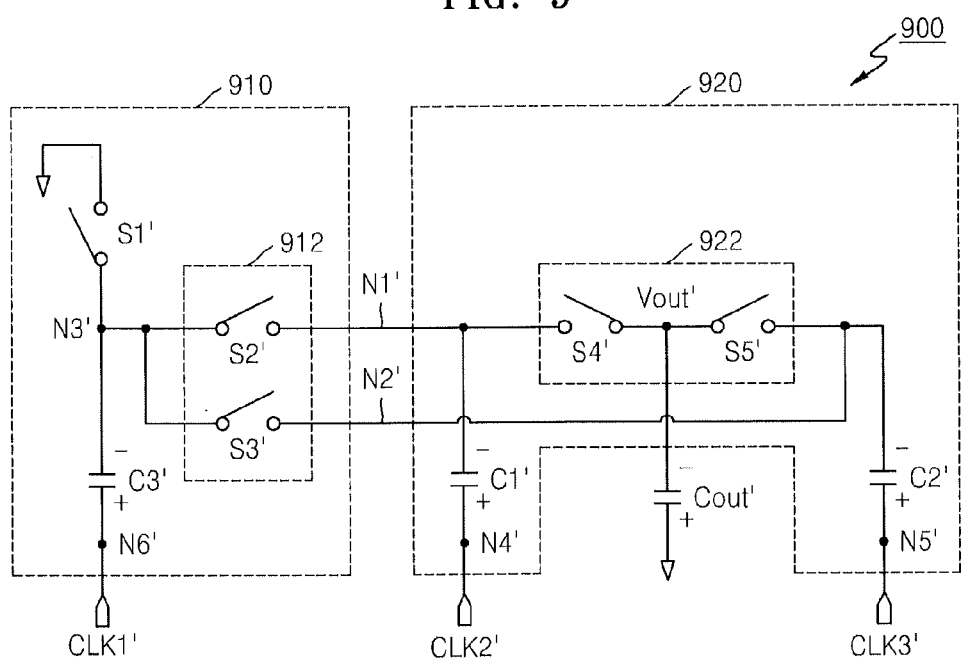
FIG. 9 is a circuit diagram of a negative charge pump according to an embodiment of the inventive concepts.

FIG. 9 is a circuit diagram of a negative charge pump 900 according to an example embodiment of the inventive concepts.

Referring to FIG. 9, the negative charge pump 900 includes a first converting unit 910 and a second converting unit 920. The first converting unit 910 includes an initialization switch S1' providing a ground voltage GND to an N3' terminal. The first converting unit 910 also includes a pumping capacitor C3' having one end connected to terminal N3' and another end receiving a clock signal CLK1'. Also, the first converting unit 910 includes a first transmitting unit 912 configured to transmit a potential voltage of the N3' terminal to an N1' terminal or an N2' terminal. The second converting unit 920 includes a pumping capacitor C1' having one end connected to a N1' terminal and an other end receiving clock signal CLK2'. The second converting unit 920 also includes a pumping capacitor C2' connected having one end connected to a N2' terminal and an other end receiving clock signal CLK3'. The second converting unit 920 also includes a second transmitting unit 922 configured to provide a potential voltage of the N1' terminal or the N2' terminal to an output terminal. If the clock signals CLK2' and CLK3' have opposite phases, and the clock signals CLK1' through CLK3' alternate between a power voltage VDD and the ground voltage GND, the negative charge pump 900 negatively boosts the power voltage VDD to generate a voltage of −2VDD. In detail, the first converting unit 910 is configured to negatively boost the power voltage VDD to generate a voltage of −VDD. Then, the first converting unit 910 transmits the voltage of −VDD to the second converting unit 920. The second converting unit 920 negatively boosts the voltage of −VDD provided from the first converting unit 910 to generate a voltage of −2VDD. The second converting unit 920 is configured to provide the voltage of −2VDD to the output terminal in response to the clock signal CLK2' for one half of a period of the clock signal CLK2', and provides the voltage of −2VDD to the output terminal in response to the clock signal CLK3' for the other half of the period of the clock signal CLK2'. Accordingly, since the second converting unit 920 can charge an output capacitor Cout' to the voltage of −2VDD for one period of either clock signal CLK2' or CLK3', the negative charge pump 900 can continually generate the voltage of −2VDD, thereby improving current supply capability.

Figure 10:
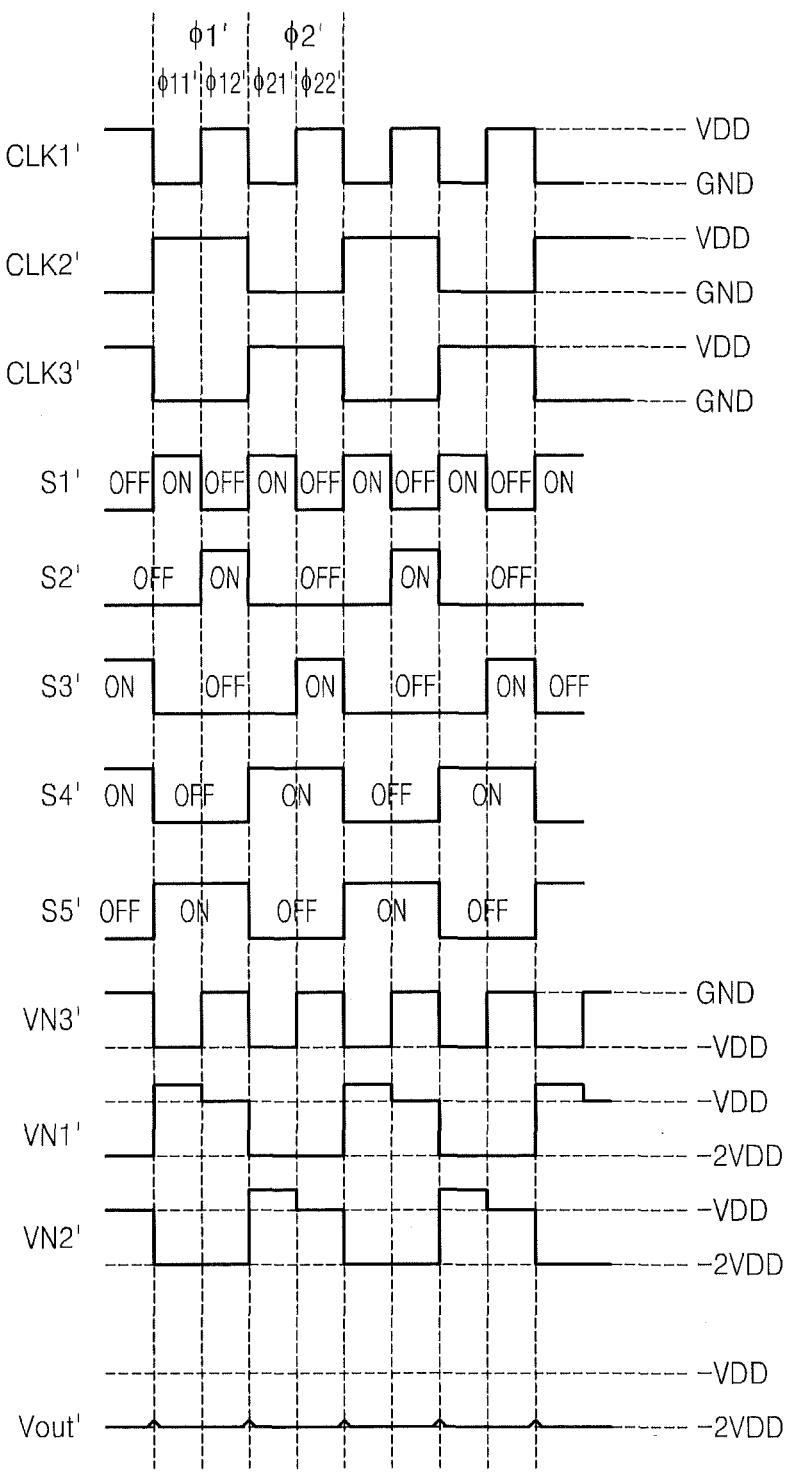
FIG. 10 is a timing diagram illustrating the operation of the negative charge pump of FIG. 9 in a steady state.

FIG. 10 is a timing diagram illustrating the operation of the negative charge pump 900 of FIG. 9 in a steady state.

Referring to FIG. 10, the clock signal CLK1' has a frequency that is two times higher than each of those of the clock signals CLK2' and CLK3'. Also, the clock signals CLK2' and CLK3' have opposite phases. The clock signals CLK1' through CLK3' alternate between the power voltage VDD and the ground voltage GND. In this example embodiment, the negative charge pump 900 can generate a voltage of −2VDD.

A process of generating a voltage of −2VDD will be briefly explained with reference to FIGS. 9 and 10. Explanation will be first made on how the first converting unit 910 negatively boosts the power voltage VDD to generate a voltage of −VDD and transmits the voltage of −VDD to the second converting unit 920. In a φ11' interval, a voltage potential of the N3' terminal is initialized to the ground voltage GND. Then, the voltage potential is negatively boosted to a voltage of −VDD in a φ12' interval. At this time, the voltage potential −VDD of the N3' terminal is transmitted to the N1' terminal. As a result, the first converting unit 910 negatively boosts the voltage potential of the N3' terminal from the ground voltage GND to the voltage of −VDD and transmits the voltage of −VDD to the N1' terminal in a φ1' interval consisting of the interval and the φ12' interval. In a φ21' interval, the potential of the N3' terminal is initialized to the ground voltage GND, and then the potential of the N3' terminal is negatively boosted to a voltage of −VDD in a φ22' interval. At this time, the potential −VDD of the N3' terminal is transmitted to the N2' terminal, unlike that in the φ12' interval. As a result, the first converting unit 910 negatively boosts the potential of the N3' terminal to the voltage of −VDD. Then, the first converting unit 910 transmits the voltage of −VDD to the N2' terminal in a φ2' interval consisting of the φ21' interval and the φ22' interval. As a result, the first converting unit 910 generates the voltage of −VDD and transmits the voltage of −VDD to the N 1' terminal in the φ1' interval. Also, the first converting unit 910 generates the voltage of −VDD and transmits the voltage of −VDD to the N2' terminal in the φ2' interval.

Next, explanation will be made on how the second converting unit 920 negatively boosts the voltage of −VDD provided from the first converting unit 910 to generate a voltage of −2VDD. It will also be explained how the second converting unit 920 provides the voltage of −2VDD to the output terminal Vout'. A voltage potential of the N1' terminal is initialized to the voltage of −VDD received from the first converting unit 910 in the φ12' interval, and is negatively boosted to a voltage of −2VDD. The second converting unit 920 also transmits the negatively boosted voltage −2VDD to the output terminal Vout' in the φ2' interval consisting of the φ21' interval and the φ22' interval. Meanwhile, a potential voltage of the N2' terminal is initialized to the voltage of −VDD received from the first converting unit 910 in the φ22' interval. Then, the second converting unit 920 is negatively boosted the voltage to a voltage of −2VDD and transmitted to the output terminal in the φ1' interval consisting of the φ11' interval and the φ12' interval. That is, the second converting unit 920 boosts the potential of the N1' terminal from the voltage of −VDD to the voltage of −2VDD and transmits the voltage of −2VDD to the output terminal in the φ2' interval. Also, the second converting unit 920 boosts the potential of the N2' terminal from the voltage of −VDD to the voltage of −2VDD and transmits the voltage of −2VDD to the output terminal in the φ1' interval. Accordingly, the negative charge pump 900 can continuously generate the voltage of −2VDD for one period (φ1'+φ2') of the clock signal CLK2' or CLK3', thereby charging the output capacitor Cout'.

The operation of the negative charge pump 900 will now be explained in detail with reference to FIGS. 11 through 14.

Figure 11:
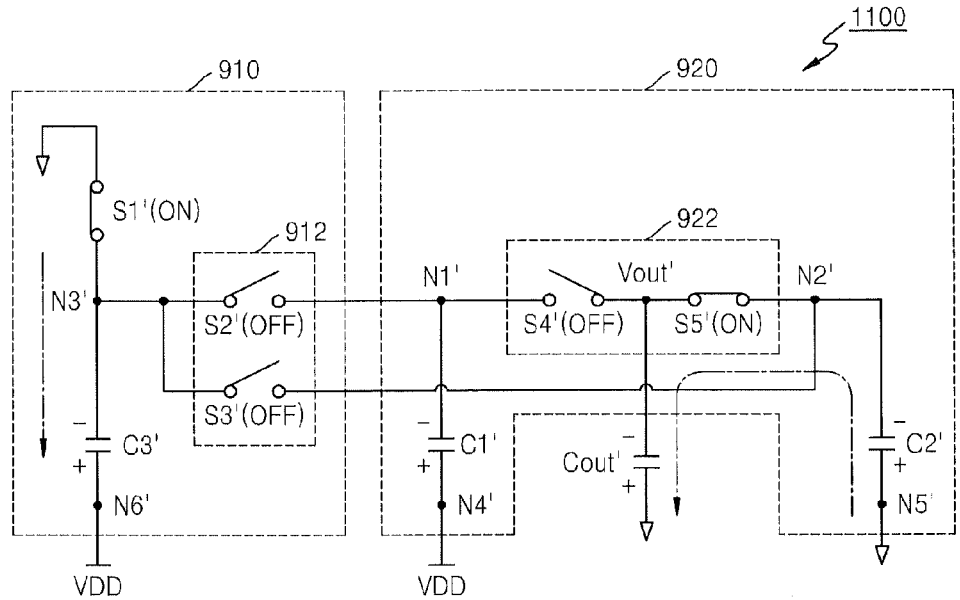
FIG. 11 is a circuit diagram illustrating the operation of the negative charge pump of FIG. 9 in a φ11 interval of FIG. 10.

FIG. 11 is a circuit diagram illustrating the operation of the negative charge pump 900 of FIG. 9 in the φ11' interval of FIG. 10.

Referring to FIG. 11, a voltage stored in the pumping capacitor C3' in the φ11' interval is lower than the power voltage VDD due to a discharge in the φ22' interval. At this time, the clock signal CLK1' that is at a higher level (GND) is applied. Thus, a potential of an N6' terminal is changed from the ground voltage to the power voltage VDD. The switch S1' is turned on to recover a potential of the N3' terminal which is higher than the ground voltage GND due to a discharge to the ground voltage GND. In the φ11' interval, the first transmitting unit 912 does not transmit the potential of the N3' terminal to the N1' terminal and the N2' terminal. That is, the switches S2' and S3' are turned off. As a result, the pumping capacitor C3' is charged to the power voltage VDD again.

A charge voltage stored in the pumping capacitor C1' in the φ11' interval is lower than a voltage of 2VDD due to a discharge in the φ2' interval. In the interval, since the clock signal CLK2' is at a higher level (VDD), a potential of the N4' terminal is changed from the ground voltage GND to the power voltage VDD. As a result, a potential of the N1' terminal is higher than a voltage of −VDD, In the interval, a voltage of 2VDD is already stored in the pumping capacitor C2'. At the φ11' interval, since the clock signal CLK3' is at a lower level (GND), a potential of the N5' terminal is changed from the power voltage VDD to the ground voltage GND. Also, a potential of the N2' terminal is negatively boosted from a voltage of −VDD to a voltage of −2VDD due to coupling effect. In the interval, the second transmitting unit 922 is configured to transmit the potential −2VDD of the N2' terminal to the output terminal. That is, the switch S4' is maintained in an off state, the switch S5' is turned on, and the potential −2VDD of the N2' terminal is transmitted to the output terminal Vout', thereby charging the output capacitor Cout'.

Figure 12:
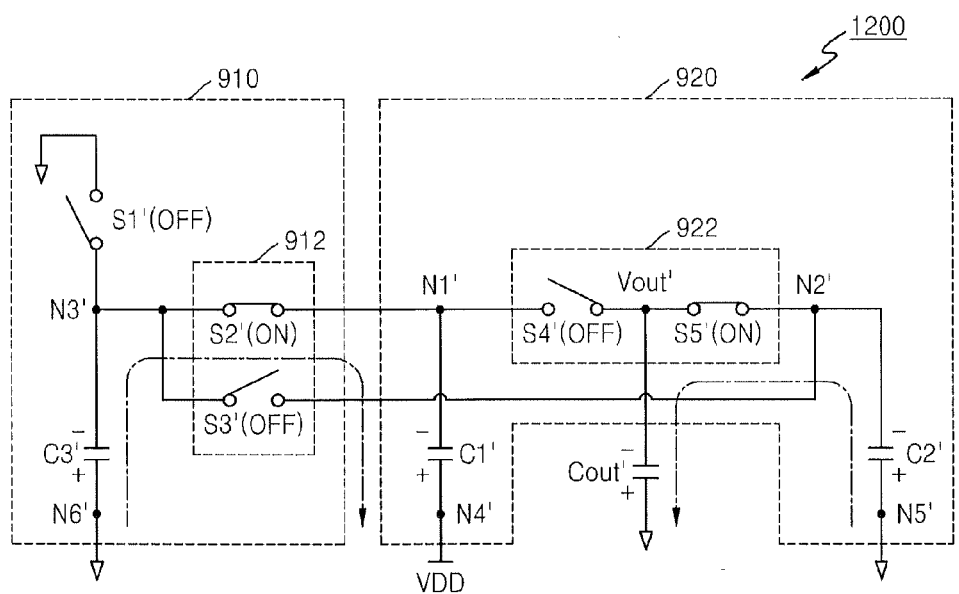
FIG. 12 is a circuit diagram illustrating the operation of the negative charge pump of FIG. 9 in a φ12 interval of FIG. 10.

FIG. 12 is a circuit diagram illustrating the operation of the negative charge pump 900 of FIG. 9 in the φ12' interval of FIG. 10.

Referring to FIG. 12, the pumping capacitor C3' is charged to the power voltage VDD in the φ12' interval. At the φ12' interval, since the switch S1' is turned off and the clock signal CLK1' is at a lower level (GND), a potential of the N6' terminal is changed from the power voltage VDD to the ground voltage GND. Also the φ12' interval, the pumping capacitor C3' is already charged to the power voltage VDD, a potential of the N3' terminal is negatively boosted from the ground voltage GND to a voltage of −VDD due to capacitor coupling effect. That is, the φ12' interval is an interval in which the first converting unit 910 generates a pumping voltage of −VDD.

Since the clock signal CLK2' is still at a higher level (VDD) in the φ12' interval, a potential of the N4 terminal is maintained at the power voltage VDD. A charge voltage stored in the pumping capacitor C1' is lower than a voltage of 2VDD due to a discharge in the φ2' interval. Accordingly, a potential of the N1' terminal is higher than a voltage of −VDD. At this time, the first transmitting unit 912 transmits the potential −VDD of the N3' terminal to the N1' terminal. That is, the switch S2' is turned on and the switch S3' is maintained in an off state. Accordingly, a potential of the N1' terminal which is higher than the voltage of −VDD due to a discharge in the φ2' interval is recovered to the voltage of −VDD in the φ12' interval. As a result, the pumping capacitor C1' is charged to a voltage of 2VDD again.

Since the clock signal CLK3' is still at a lower level (VDD) in the φ12' interval, a potential of the N5' terminal is maintained at the ground voltage GND. In the φ12' interval, the second transmitting unit 922 transmits a potential of the N2' terminal to the output terminal. That is, since the switch S4' is turned off and the switch S5' is turned on, the potential of the N2' terminal is transmitted to the output terminal Vout', thereby charging the output capacitor Cout'.

Figure 13:
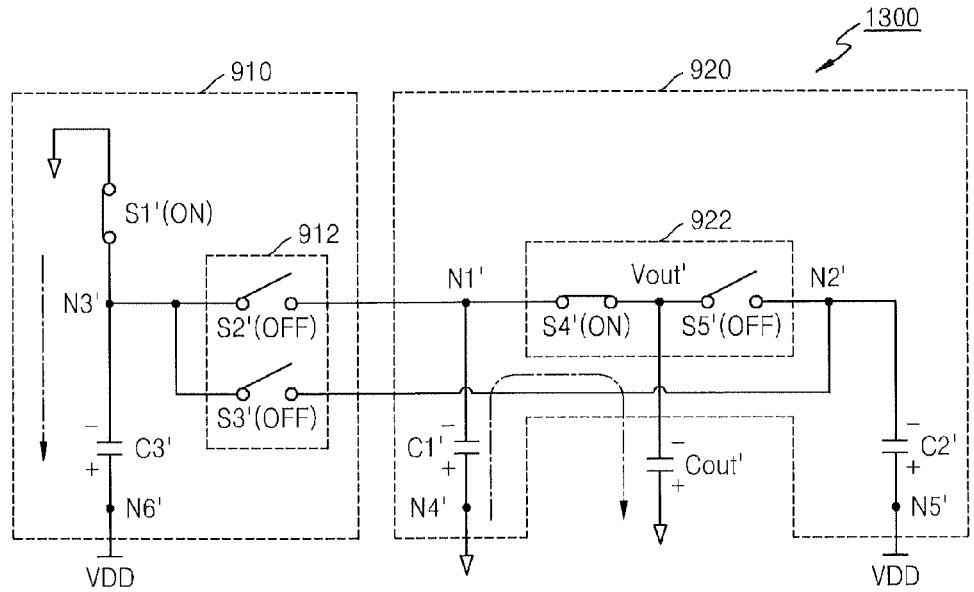
FIG. 13 is a circuit diagram illustrating the operation of the negative charge pump of FIG. 9 in a φ21 interval of FIG. 10.

FIG. 13 is a circuit diagram illustrating the operation of the negative charge pump 900 of FIG. 9 in the φ21' interval of FIG. 10.

Referring to FIG. 13, a charge voltage stored in the pumping capacitor C3' in the φ21' interval is lower than the power voltage VDD due to a discharge in the φ12' interval. In the φ21' interval, the clock signal CLK1' that is at a higher level (GND) is applied to the N6' terminal. Thus, a potential of the N6' terminal is changed from the ground voltage GND to the power voltage VDD. The switch S1' is turned on to recover a potential of the N3' terminal which is higher than the ground voltage GND due to a discharge to the ground voltage GND. In the φ21' interval, the first transmitting unit 912 does not transmit the potential of the N3' terminal to the N1' terminal and the N2' terminal. That is, the switch S2' is turned off and the switch S3' is maintained in an off state. As a result, the pumping capacitor C3' is charged to the power voltage VDD again.

A voltage charge of 2VDD is already stored in the pumping capacitor C1' in the φ21' interval. Since the clock signal CLK2' is at a lower level (GND), a potential of the N4' terminal is changed from the power voltage VDD to the ground voltage GND. Accordingly, a potential of the N1' terminal is negatively boosted from a voltage of −VDD to a voltage of −2VDD due to capacitor coupling effect. In the φ21' interval, the second transmitting unit 922 transmits the potential −2VDD of the N1' terminal to the output terminal. That is, the switch S4' is turned on, the switch S5' is turned off, and the potential −2VDD of the N1' terminal is transmitted to the output terminal Vout', thereby charging the output capacitor Cout'.

A In the φ21 interval, a charge voltage stored in the pumping capacitor C2' may be lower than a voltage of 2VDD due to a discharge in the φ1' interval. Since the clock signal CLK3' is at a higher level (VDD), a potential of the N5' terminal is changed from the ground voltage GND to the power voltage VDD. As a result, a potential of the N2' terminal is higher than a voltage of −VDD.

Figure 14:
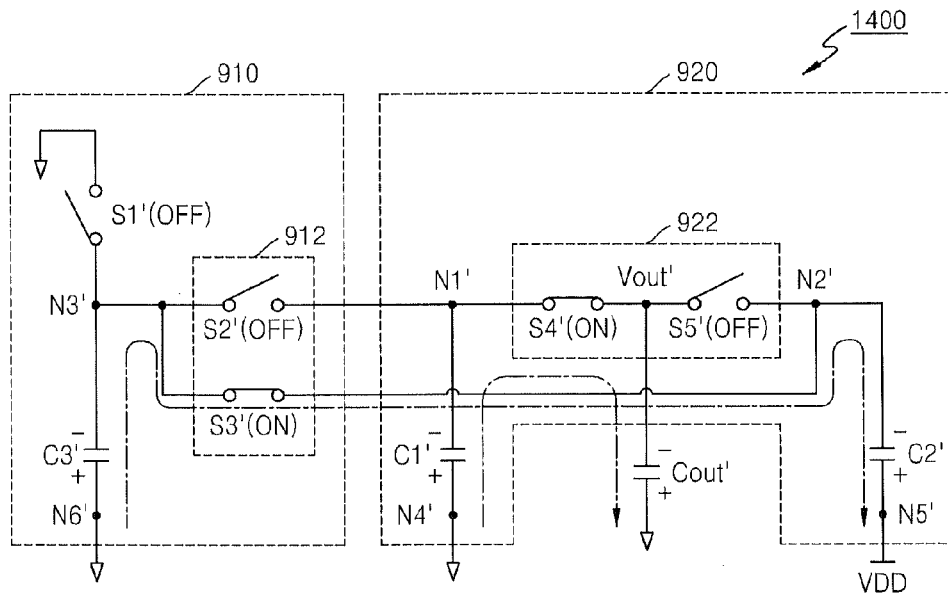
FIG. 14 is a circuit diagram illustrating the operation of the negative charge pump of FIG. 9 in a φ22 interval of FIG. 10.

FIG. 14 is a circuit diagram illustrating the operation of the negative charge pump 900 of FIG. 9 in the φ22' interval of FIG. 10.

Referring to FIG. 14, the pumping capacitor C3' is charged to the power voltage VDD in the φ22' interval. In the φ22' interval, the switch S1' is turned off and the clock signal CLK1' is at a lower level (GND), a potential of the N6' terminal is changed from the power voltage VDD to the ground voltage GND. Since the pumping capacitor C3' is already charged to the power voltage VDD, a potential of the N3' terminal is negatively boosted from the ground voltage to a voltage of −VDD due to capacitor coupling effect. That is, during the φ22' interval the first converting unit 910 is configured to generate a pumping voltage of −VDD, like the φ12' interval.

Since the clock signal CLK2' is still at a lower level (GND) in the φ22' interval, a potential of the N4' terminal is maintained at the ground voltage GND. The second transmitting unit 922 is configured to transmit a potential of the N1' terminal to the output terminal Vout'. That is, since the switch S4' is turned on and the switch S5' is turned off, the potential of the N1' terminal is transmitted to the output terminal, thereby charging the output capacitor Cout'.

Since the clock signal CLK3' is still at a higher level (VDD) in the φ22' interval, a potential of the N5' terminal is maintained at the power voltage VDD. A charge voltage which is stored in the pumping capacitor C2' is lower than a voltage of 2VDD due to a discharge in the φ1' interval. Accordingly, a potential of the N2' terminal is higher than a voltage of −VDD. In the φ22' interval, the first transmitting unit 912 transmits the potential −VDD of the N3' terminal to the N2' terminal That is, the switch S2' is still turned off and the switch S3' is turned on. Accordingly, a potential of the N2' terminal which is higher than a voltage of −VDD due to a discharge is recovered to the voltage of −VDD in the φ22' interval. As a result, the pumping capacitor C2' is charged to a voltage of 2VDD again.

Figure 15:
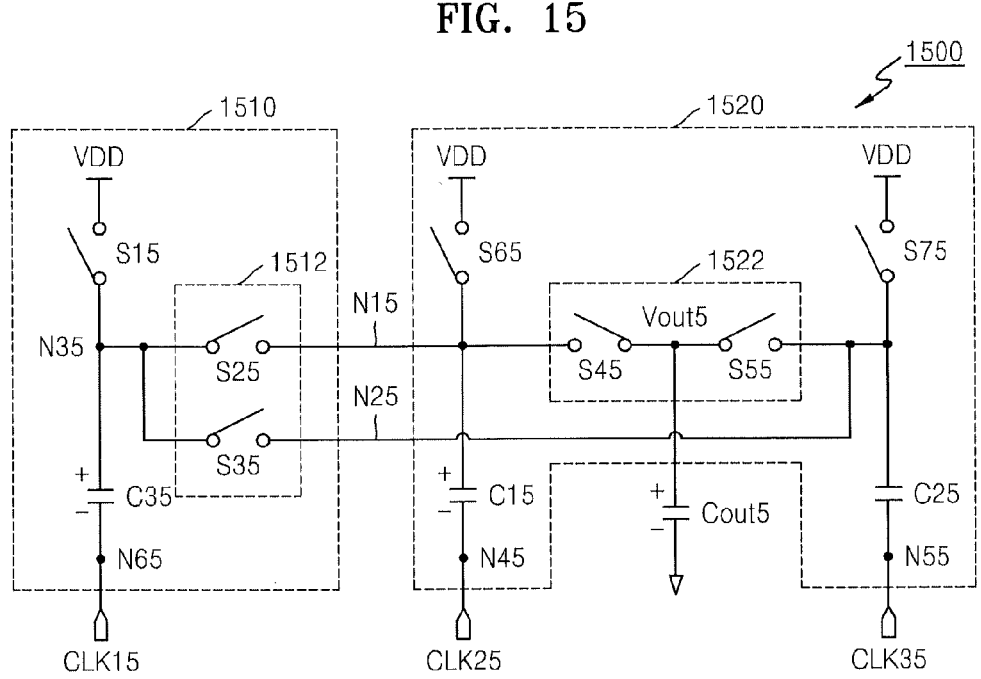
FIG. 15 is a circuit diagram of a positive charge pump according to another embodiment of the inventive concepts.

FIG. 15 is a circuit diagram of a positive charge pump 1500 according to another embodiment of the inventive concepts.

Referring to FIG. 15, the positive charge pump 1500 includes a first converting unit 1510 and a second converting unit 1520. The first converting unit 1510 includes an initialization switch S15 configured to supply a power voltage VDD to an N35 terminal. The charge pump 1500 also includes a pumping capacitor C35 having one end connected to a N35 terminal and another end receiving clock signal CLK15. The charge pump 1500 may also include a first transmitting unit 1512 configured to transmit a potential of the N35 terminal to an N15 terminal or an N25 terminal. The first transmitting unit 1512 may include a switch S25 and a switch S35 respectively transmitting the potential of the N35 terminal to the N15 terminal and the N25 terminal. The second converting unit 1520 includes a pumping capacitor C15 having one end connected to terminal N15 and an other end receiving a clock signal CLK25. The second converting unit 1520 may also include a pumping capacitor C25 having a first end connected to the N25 terminal and another end receiving the clock signal CLK35. The second converting unit 1520 may have a second transmitting unit 1522 providing a potential of the N15 terminal or the N25 terminal to an output terminal. The second transmitting unit 1522 may have initialization switches S65 and S75 respectively providing the power voltage VDD to the N15 terminal and the N25 terminal. The second transmitting unit 1522 may include a switch S45 providing the potential of the N15 terminal to the output terminal and a witch S55 transmitting the potential of the N25 terminal to the output terminal. If the clock signals CLK25 and CLK35 have opposite phases and the clock signals CLK15 through CLK35 alternate between the power voltage VDD and a ground voltage GND. Also, the positive charge pump 1500 may be configured to selectively generate a voltage of 2VDD or 3VDD using the power voltage VDD. For example, if the positive charge pump 1500 generates a voltage of 2VDD, the first converting unit 1510 is inactivated. Therefore, the initialization switches S65 and S75 of converting unit 1510 are alternately turned on and off Accordingly, the second converting unit 1520 generates a voltage of 2VDD. If the positive charge pump 1500 generates a voltage of 3VDD, the first converting unit 1510 is activated, and the initialization switches S65 and S75 are inactivated to be maintained in an off state. Accordingly, the first converting unit 1510 generates a voltage of 2VDD and the second converting unit 1520 generates a voltage of 3VDD. In an example embodiment, the positive charge pump 1500 generates the voltage of 2VDD or 3VDD to charge the output capacitor for one period of the clock signal CLK25 or CLK35.

Figure 16:
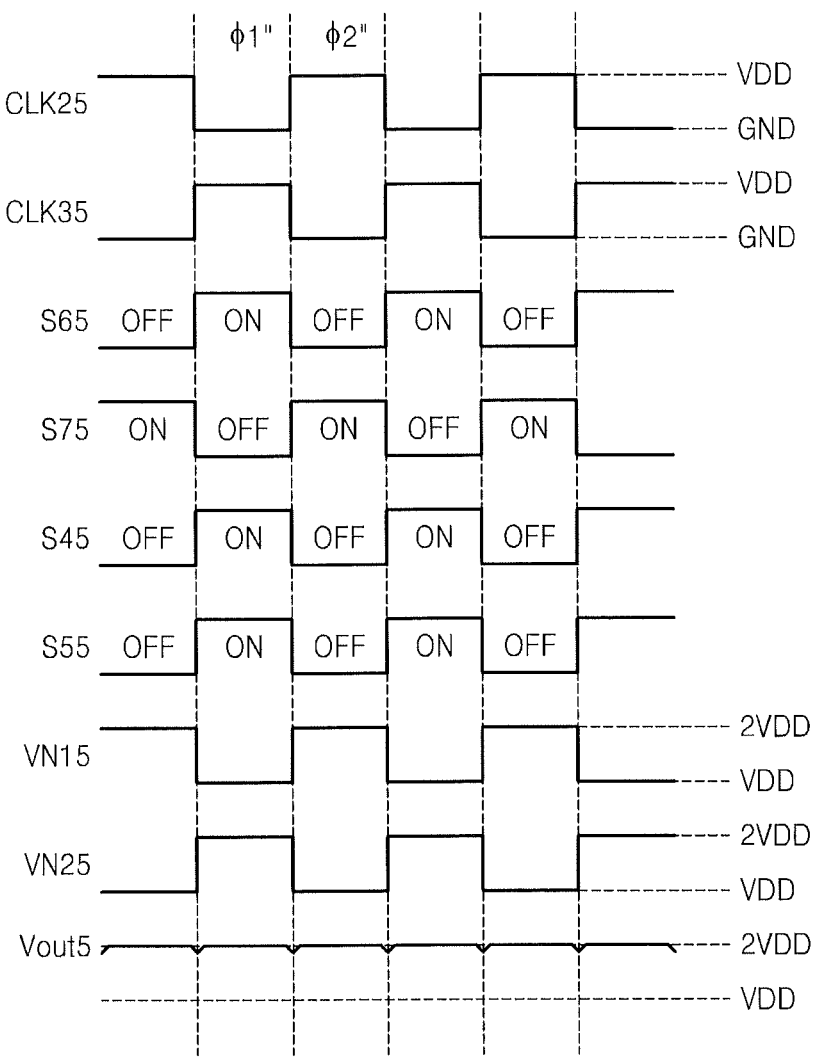
FIG. 16 is a timing diagram illustrating the operation of the positive charge pump of FIG. 15 which generates a voltage of 2VDD in a steady state.

FIG. 16 is a timing diagram illustrating the operation of the positive charge pump 1500 of FIG. 15 which generates a voltage of 2VDD in a steady state.

Referring to FIG. 16, the clock signals CLK25 and CLK35 have opposite phases, and alternate between the power voltage VDD and the ground voltage GND. In this example embodiment, the positive charge pump 1500 may generate a voltage of 2VDD that is two times higher than the power voltage VDD.

Since the operation of the positive charge pump 1500 in a 3VDD generation mode is somewhat similar to the operation of the positive charge pump 300 of FIG. 3, a detailed explanation thereof will not be given.

The operation of the positive charge pump 1500 in a 2VDD generation mode will be explained in detail with reference to FIGS. 17 and 18.

Figure 17:
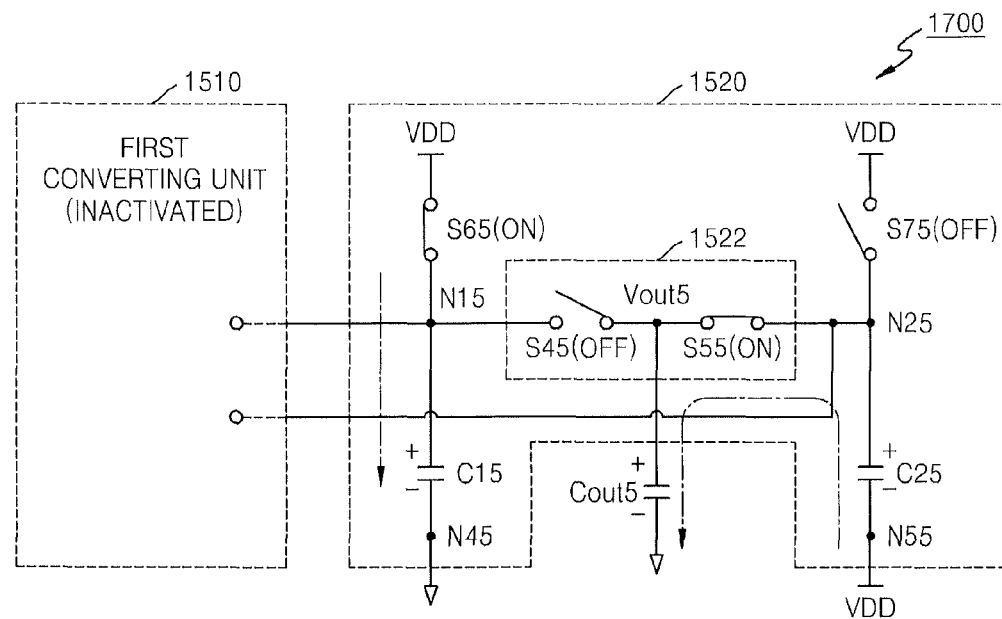
FIG. 17 is a circuit diagram illustrating the operation of the positive charge pump of FIG. 15 which generates a voltage of 2VDD in a φ1 interval of FIG. 16.

FIG. 17 is a circuit diagram illustrating the operation of the positive charge pump 1500 of FIG. 15 which generates a voltage of 2VDD in the φ1" interval of FIG. 16.

Referring to FIG. 17, a charge voltage stored in the pumping capacitor C15 may be lower than the power voltage VDD due to a discharge in the φ2" interval. Since the clock signal CLK25 is at a lower level (GND) in the φ1" interval, a potential of the N45 terminal is changed from the power voltage VDD to the ground voltage GND. Accordingly, a potential of the N15 terminal is lower than the power voltage VDD. The initialization switch S65 is turned on to recover the potential of the N15 terminal to the power voltage VDD. As a result, the power voltage VDD is applied to both ends of the pumping capacitor C15, thereby storing a charge corresponding to the power voltage VDD. Also in the φ1" interval, the pumping capacitor C25 is already charged to the power voltage VDD, and a potential of the N25 terminal is at the power voltage VDD. The initialization switch S75 is turned off Since the clock signal CLK35 is at a higher level (VDD), a potential of the N55 terminal is changed from the ground voltage GND to the power voltage VDD. Accordingly, a potential of the N25 terminal is positively boosted from the power voltage to a voltage of 2VDD due to capacitor coupling effect. Additionally in the φ1" interval, the second transmitting unit 1522 transmits the potential 2VDD of the N25 terminal to the output terminal, thereby charging the output capacitor Cout5.

Figure 18:
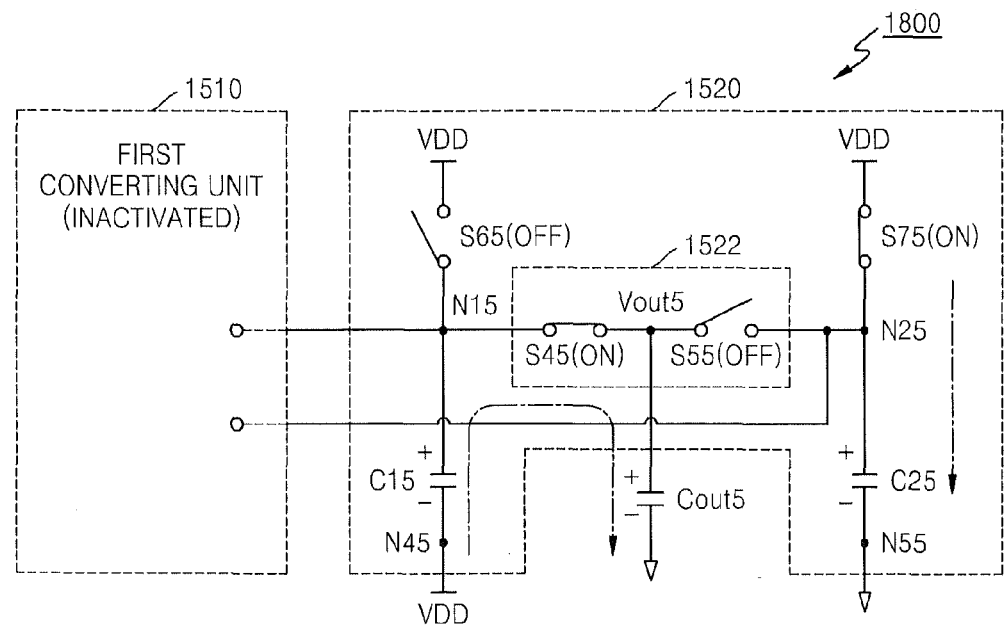
FIG. 18 is a circuit diagram illustrating the operation of the positive charge pump of FIG. 15 which generates a voltage of 2VDD in a φ2 interval of FIG. 16.

FIG. 18 is a circuit diagram illustrating the operation of the positive charge pump 1500 of FIG. 15 which generates a voltage of 2VDD in the φ2" interval of FIG. 16.

Referring to FIG. 18, the pumping capacitor C15 is charged to the power voltage VDD and a potential of the N15 terminal is at the power voltage VDD in the φ2" interval. The initialization switch S65 is turned off Since the clock signal CLK25 is at a higher level (VDD), a potential of the N45 terminal is changed from the ground voltage GND to the power voltage VDD. Accordingly, a potential of the N15 terminal is positively boosted from the power voltage VDD to a voltage of 2VDD due to capacitor coupling effect. Also in the φ2" interval, the second transmitting unit 1522 transmits the potential 2VDD of the N15 terminal to the output terminal, thereby charging the output capacitor. Additionally, in the φ2" interval, charge voltage stored in the pumping capacitor C25 may be lower than the power voltage VDD due to a discharge in the φ1" interval. Since the clock signal CLK35 is at a lower level (GND), a potential of the N55 terminal is changed from the power voltage VDD to the ground voltage GND. Accordingly, a potential of the N25 terminal is lower than the power voltage VDD. The initialization switch S75 is turned on to recover the potential of the N25 terminal to the power voltage VDD. As a result, the power voltage VDD is applied to both ends of the pumping capacitor C25, thereby storing charge corresponding to the power voltage VDD in the pumping capacitor C25.

As a result, since the positive charge pump 1500 continuously charges the output capacitor Cout5 to a voltage of 2VDD for one period of the clock signal CLK25 or CLK35, output voltage ripple according to a load current can be minimized.

Figure 19:
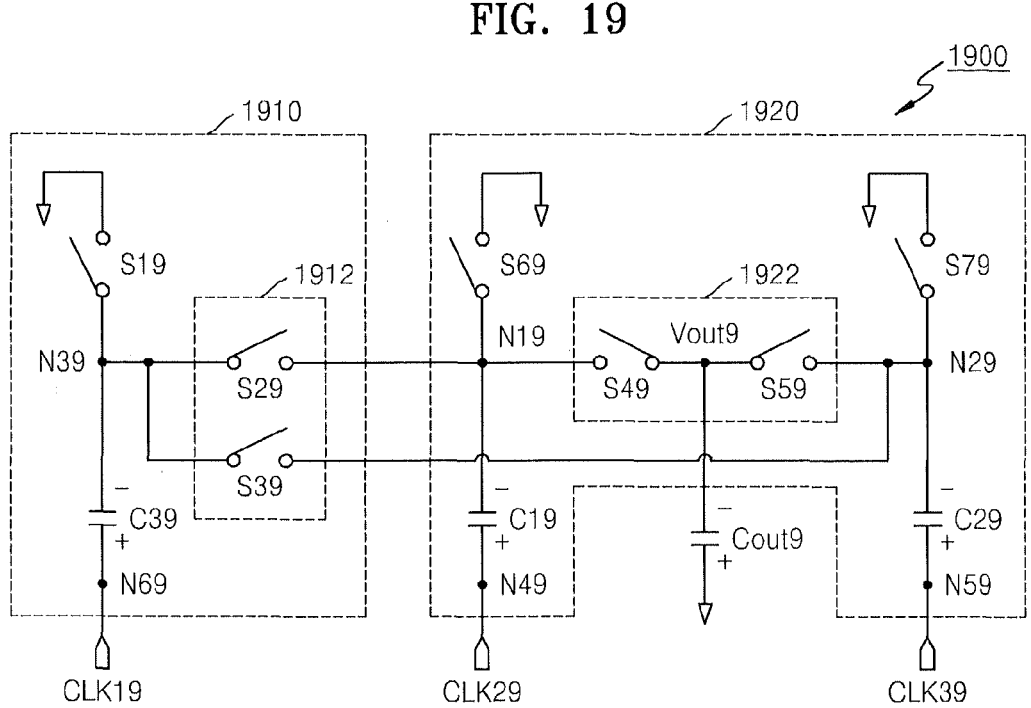
FIG. 19 is a circuit diagram of a negative charge pump according to another embodiment of the inventive concepts.

FIG. 19 is a circuit diagram of a negative charge pump 1900 according to another embodiment of the inventive concepts.

Referring to FIG. 19, the negative charge pump 1900 includes a first converting unit 1910 and a second converting unit 1920. The first converting unit 1910 includes an initialization switch S19 providing a ground voltage GND to an N39 terminal, a pumping capacitor C39 having one end connected to N39 terminal and another end receiving a clock signal CLK19. The first converting unit 1910 may also have a first transmitting unit 1912 transmitting a potential of the N39 terminal to an N19 terminal or an N29 terminal. The first transmitting unit 1912 may include switches S29 and S39 respectively transmitting a potential of the N39 terminal to the N19 terminal and the N29 terminal. The second converting unit 1920 includes a pumping capacitor C19 having one end connected to the N19 terminal and an other end receiving a clock signal CLK29 The second converting unit 1920 may also have a pumping capacitor C29 having one end connected to the N29 terminal and another end connected to a clock signal CLK39. The second converting unit may include a second transmitting unit 1922 providing a potential of the N19 terminal or the N29 terminal to an output terminal. The converting transmitting unit 1920 may include initialization switches S69 and S79 respectively providing a ground voltage GND to the N19 terminal and the N29 terminal. The second transmitting unit 1922 may include a switch S49 providing the potential of the N19 terminal to the output terminal, and a switch S59 providing the potential of the N29 terminal to the output terminal. If the clock signals CLK29 and CLK39 have opposite phases, and the clock signals CLK19 through CLK39 alternate between the power voltage VDD and the ground voltage GND, the negative charge pump 1900 may selectively generate a voltage of –VDD or –2VDD using the power voltage VDD. For example, if the negative charge pump 1900 generates a voltage of –VDD, the first converting unit 1910 is inactivated, and the initialization switches S69 and S79 are activated to be alternately turned on and off. Accordingly, the second converting unit 1920 generates a voltage of –VDD. Meanwhile, if the negative charge pump 1900 generates a voltage of –2VDD, the first converting unit 1910 is activated, and the initialization switches S69 and S79 are inactivated to be maintained in an off state. Accordingly, the first converting unit 1910 generates a voltage of –VDD, and the second converting unit 1920 generates a voltage of –2VDD. In an example embodiment, the negative charge pump 1900 generates the voltage of –VDD or –2VDD to charge the output capacitor Cout9 for one period of the clock signal CLK29 or CLK39.

Figure 20:
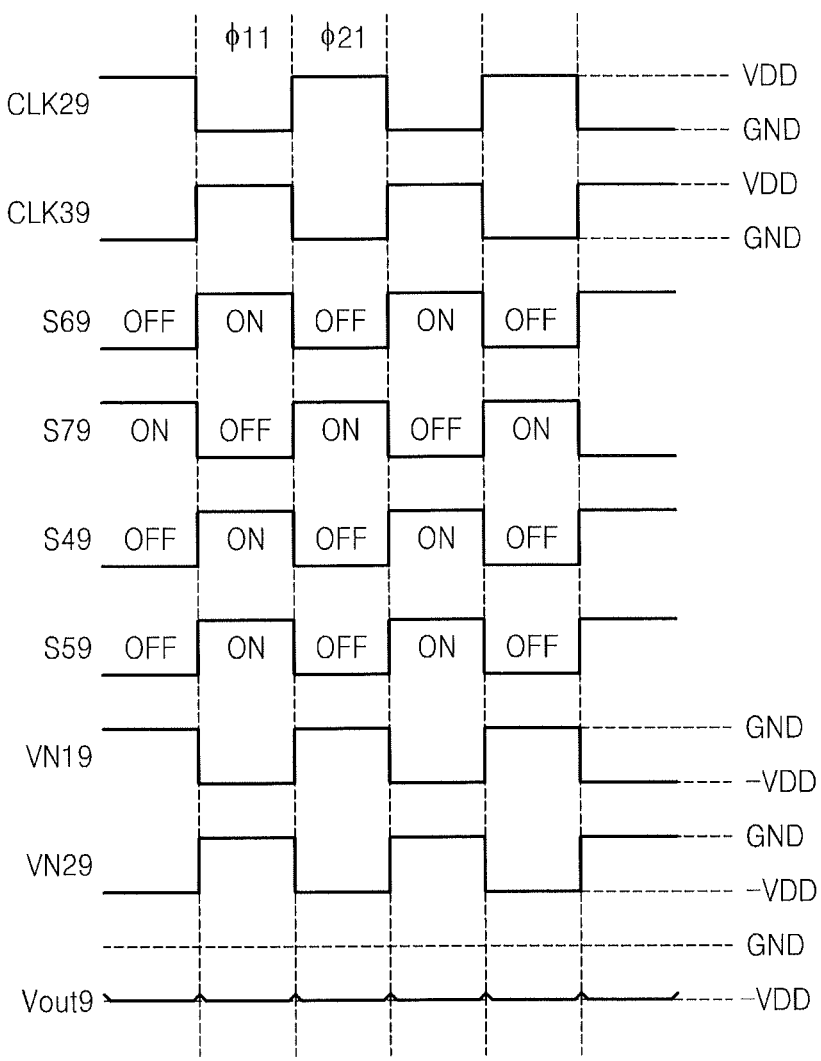
FIG. 20 is a timing diagram illustrating the operation of the negative charge pump of FIG. 19 which generates a voltage of −VDD in a steady state.

FIG. 20 is a timing diagram illustrating the operation of the negative charge pump 1900 of FIG. 19 which generates a voltage of –VDD in a steady state.

Referring to FIG. 20, the clock signals CLK29 and CLK39 have opposite phases, and alternate between the power voltage VDD and the ground voltage GND. In an example embodiment, the negative charge pump 1900 is configured to generate a voltage of –VDD.

Since the operation of the negative charge pump 1900 in a 2VDD generation mode is somewhat similar to the operation of the negative charge pump 900 of FIG. 9 a detailed explanation thereof will not be given.

The operation of the negative charge pump 1900 in a –VDD generation mode will be explained with reference to FIGS. 21 and 22.

Figure 21:
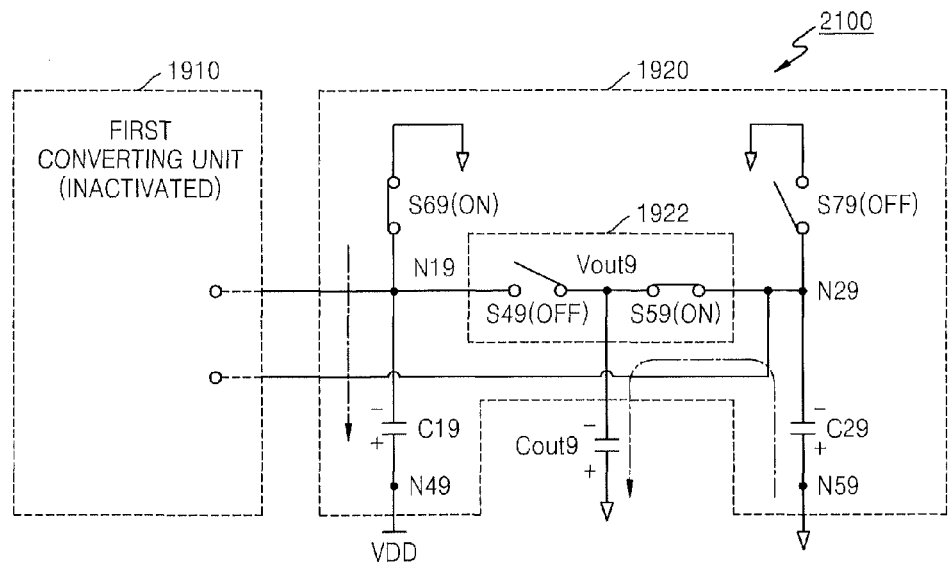
FIG. 21 is a circuit diagram illustrating the operation of the negative charge pump of FIG. 19 which generates a voltage of −VDD in a φ1 interval of FIG. 20.

FIG. 21 is a circuit diagram illustrating the operation of the negative charge pump 1900 of FIG. 19 which generates a voltage of –VDD in the φ11 interval of FIG. 20.

Referring to FIG. 21, a voltage according to the amount of charge stored in the pumping capacitor C19 may be lower than the power voltage VDD due to a discharge in the φ21 interval. Since the clock signal CLK29 is at a higher level in the φ11 interval, a potential of the N49 terminal is changed from the ground voltage GND to the power voltage VDD. Accordingly, a potential of the N19 terminal is higher than the ground voltage GND. In the φ11 interval, the initialization switch S69 is turned on to recover the potential of the N19 terminal to the ground voltage GND. As a result, the power voltage VDD is applied to both ends of the pumping capacitor C19, thereby storing charge the amount of which corresponds to the power voltage VDD. Meanwhile, the pumping capacitor C29 is already charged to the power voltage VDD, and a potential of the N29 terminal is at the ground voltage GND. The initialization switch S79 is turned off. Since the clock signal CLK39 is at a lower level (GND), a potential of the N59 is changed from the power voltage VDD to the ground voltage GND. Accordingly, a potential of the N29 terminal is negatively boosted from the ground voltage GND to a voltage of –VDD due to capacitor coupling effect. At this time in the φ11 interval, the second transmitting unit 1922 transmits the potential –VDD of the N221 terminal to the output terminal, thereby charging the output capacitor Cout9.

Figure 22:
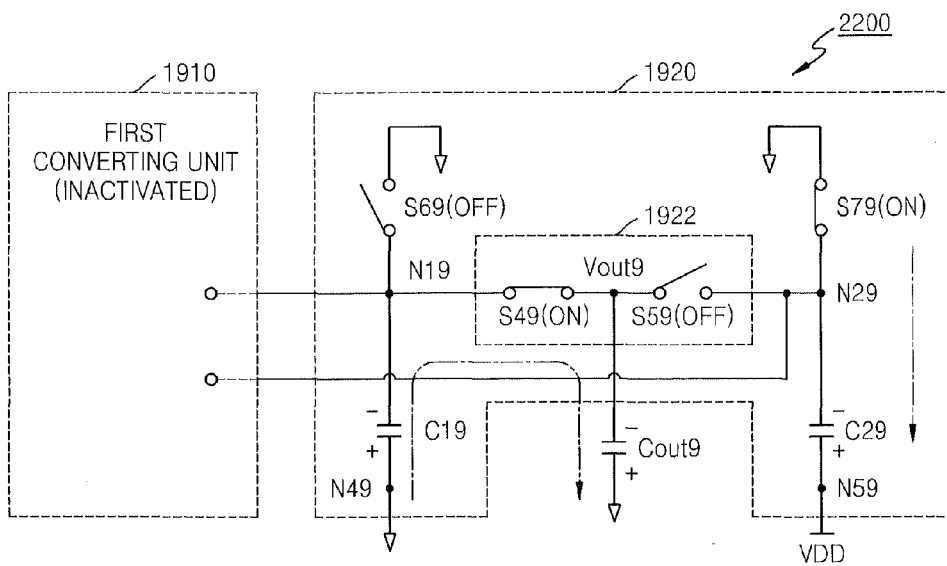
FIG. 22 is a circuit diagram illustrating the operation of the negative charge pump of FIG. 19 which generates a voltage of −VDD in a φ2 interval of FIG. 20.

FIG. 22 is a circuit diagram illustrating the operation of the negative charge pump 1900 of FIG. 19 which generates a voltage of –VDD in the φ21 interval of FIG. 2.

Referring to FIG. 22, the pumping capacitor C19 is already charged to the power voltage VDD in the φ12 interval, and a potential of the N19 terminal is at the ground voltage GND. In the φ21 interval the initialization switch S69 is turned off Since the clock signal CLK29 is at a lower level (GND), a potential of the N49 terminal is changed from the power voltage VDD to the ground voltage GND. Accordingly, a potential of the N19 terminal is negatively boosted from the ground voltage GND to a voltage of –VDD due to capacitor coupling effect. At this time in the φ21 interval, the second transmitting unit 1922 transmits the potential –VDD of the N19 terminal to the output terminal, thereby charging the output capacitor Cout9. Meanwhile in the φ21 interval, a voltage according to the amount of charge stored in the pumping capacitor C29 is lower than the power voltage VDD due to a discharge in the φ11 interval. Since the clock signal CLK39 is at a higher level (VDD), a potential of the N59 terminal is changed from the ground voltage GND to the power voltage VDD. Accordingly, a potential of the N29 terminal is higher than the ground voltage GND. The initialization switch S79 is turned on to recover the potential of the N29 terminal to the ground voltage GND. As a result, the power voltage VDD is applied to both ends of the pumping capacitor C29, thereby storing charge the amount of which corresponds to the power voltage VDD again.

As a result, since the negative charge pump 1900 charges the output capacitor Cout9 to the power voltage VDD during one period of the clock signal CLK29 or CLK39 in a −VDD generation mode, output voltage ripple can be minimized.

Figure 23:
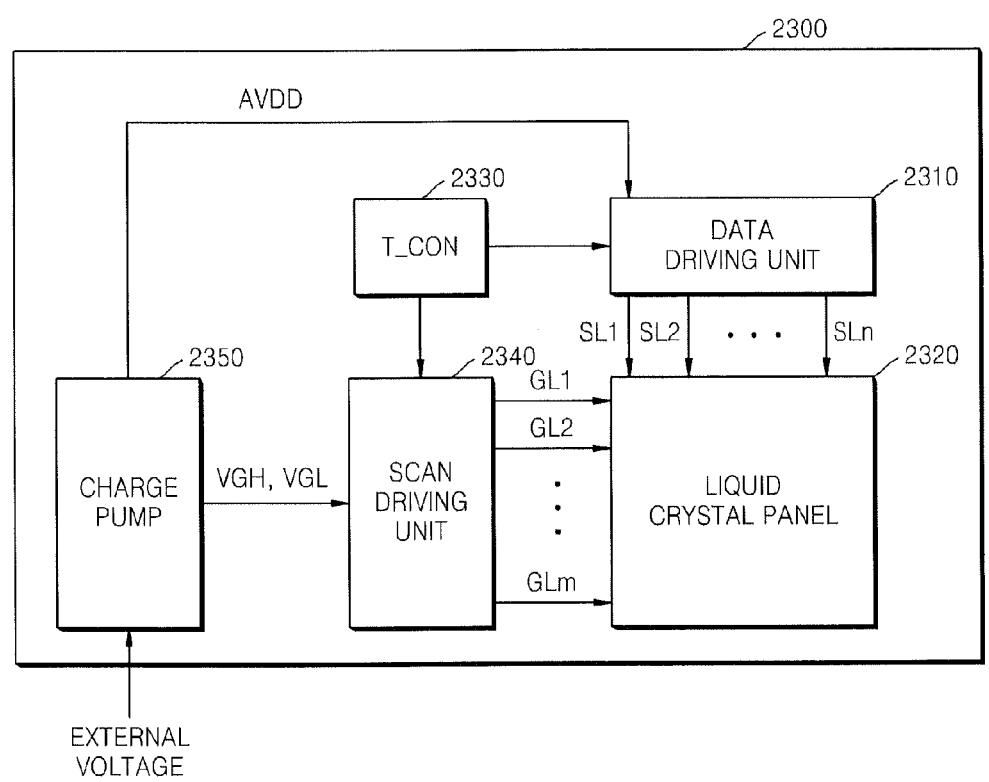
FIG. 23 is a block diagram of a display driving system according to an embodiment of the inventive concepts.

FIG. 23 is a block diagram of a display driving system 2300 according to an embodiment of the inventive concepts.

Referring to FIG. 23, the display driving system, 2300 includes a timing controller 2330, a scan driving unit 2340, a data driving unit 2310, a liquid crystal panel 2320, and a charge pump 2350. The timing controller 2330 is configured to generate a control signal for controlling the scan driving unit 2340 and the data driving unit 2310. The timing controller 2330 is also configured to transmit an external image signal to the data driving unit 2310.

In detail, the scan driving unit 2340 and the data driving unit 2310 drive the liquid crystal panel 2320 according to the control signal provided by the timing controller 2330. The scan driving unit 2340 sequentially applies scan signals to row electrodes of the liquid crystal panel 2320, and thin film transistors (TFTs) connected to the row electrodes are sequentially increased as the scan signals are applied to the row electrodes. A gradation voltage supplied by the data driving unit 2310 is applied to a liquid crystal through the TFTs connected to the row electrodes to which the scan signals are applied. The gradation voltage is used to control the angle of rotation of the liquid crystal and adjust the amount of transmitted light. In order to drive a liquid crystal display (LCD), a source line driving voltage AVDD that is a positive voltage higher than a power voltage VCI input from an external battery is desired or required. Also to drive the liquid crystal display a boosting voltages, such as a gate line high voltage VGH and a gate line low voltage VGL that is a negative voltage lower than a ground voltage GND is desired or required. The source line driving voltage AVDD is used as a driving voltage of source lines for the TFT-LCD pixels. The gate line high voltage VGH and the gate line low voltage VGL are used as a driving voltage of gate lines for the TFT-LCD pixels.

The charge pump 2350 receives a power voltage VCI of about 2.5 to 3.3 V and is configured to generate the voltages AVDD and VGH obtained by positively boosting the power voltage VCI. The charge pump 2350 may also generate a voltage VGL obtained by negatively boosting the power voltage VCI. Also the charge pump 2350, may provide the voltages AVDD, VGH, and VGL to the scan driving unit 2340 and the data driving unit 2310. The data driving unit 2310 receives the source line driving voltage AVDD from the charge pump 2350 and supplies a gradation voltage corresponding to a received image signal. The scan driving unit 2340 receives the gate line higher voltage VGH and the gate line lower voltage VGL from the charge pump 2350 and may use them as on-off voltages of the TFTs connected to the row electrodes.

While embodiments of inventive concepts have been particularly shown and described with reference to exemplary embodiments thereof using specific terms, the embodiments and terms have been used to explain the inventive concept and should not be construed as limiting the scope of the inventive concept defined by the claims. Therefore, the scope of the inventive concepts is defined not by the detailed description of the inventive concepts but by the appended claims, and all differences within the scope will be construed as being included in the inventive concepts.

What is claimed is:

1. A charge pump comprising:
   a first converting unit configured to receive a first voltage in response to a first clock signal to generate a first pumping voltage, and the first converting unit configured to alternately output the first pumping voltage to a first terminal and a second terminal; and
   a second converting unit configured to receive the first pumping voltage through the first terminal or the second terminal in response to a second clock signal and a third clock signal respectively, to generate a second pumping voltage, and the second converting unit configured to provide the second pumping voltage to an output terminal,
   wherein the second converting unit is configured to provide the second pumping voltage to the output terminal for at least half of a period of one of the second clock signal and the third clock signal, and
   wherein the first, second, third clock signals are separate signals, and a frequency of the first clock signal is twice a frequency of the second clock signal, and the second clock signal and the third clock signal have opposite phases.

2. The charge pump of claim 1, wherein the first converting unit comprises:
   a first initialization switch configured to provide a power voltage to a third terminal;
   a first pumping capacitor having one end connected to the third terminal and another end receiving the first clock signal; and
   a first transmitting unit configured to provide a voltage of the third terminal to the first terminal or the second terminal.

3. The charge pump of claim 2, wherein the second converting unit comprises:
   a second pumping capacitor having one end connected to the first terminal and another end receiving the second clock signal;
   a third pumping capacitor having one end connected to the second terminal and another end receiving third clock signal; and
   a second transmitting unit configured to provide a voltage of the first terminal and the second terminal to the output terminal.

4. The charge pump of claim 3, wherein,
   the first transmitting unit comprises a first switch and a second switch configured to respectively transmit a voltage of the third terminal to the first terminal and the second terminal, and
   the second transmitting unit comprises a third switch and a fourth switch configured to respectively provide a voltage of the first terminal and a voltage of the second terminal to the output terminal.

5. The charge pump of claim 3,
   wherein, when the first through third clock signals respectively have a first phase, a first phase, and a second phase, the first initialization switch is configured to turn on to provide the power voltage to the third terminal and the second transmitting unit is configured to provide a voltage of the second terminal to the output terminal,
   when the first through third clock signals respectively have a second phase, a first phase, and a second phase, the first initialization switch is configured to turn off, the first transmitting unit is configured to provide a voltage of the third terminal to the first terminal, and the second transmitting unit is configured to provide a voltage of the second terminal to the output terminal,
   when the first through third clock signals respectively have a first phase, a second phase, and a first phase, the first initialization switch is configured to is turn on to provide the power voltage to the third terminal and the second transmitting unit is configured to provide a voltage of the first terminal to the output terminal, and when the first through third clock signals respectively have a second phase, a second phase, and a first phase, the first initialization switch is configured to turn off, the first transmitting unit is configured to provide a voltage of the third terminal to the second terminal, and the second transmitting unit is configured to provide a voltage of the first terminal to the output terminal.

6. The charge pump of claim 5, wherein, the first through third clock signals alternate between the power voltage and a ground voltage, and the first voltage is the power voltage.

7. The charge pump of claim 3, wherein the second converting unit further comprises:
   a second initialization switch and a third initialization switch configured to respectively provide the power voltage to the first terminal and the second terminal.

8. The charge pump of claim 7, wherein,
   in a first mode, the first converting unit is activated and the second and third initialization switches are inactivated to be maintained in an off state, and
   in a second mode, the first converting unit is inactivated, and the second and third initialization switches are activated to be repeatedly turned on and off.

9. The charge pump of claim 8,
   wherein, in the first mode, when the first through third clock signals respectively have a first phase, a first phase, and a second phase, the first initialization switch is configured to turn on to provide the power voltage to the third terminal and the second transmitting unit is configured to provide a voltage of the second terminal to the output terminal,
   when the first through third clock signals respectively have a second phase, a first phase, and a second phase, the first initialization switch is configured to turn off, the first transmitting unit is configured to provide a voltage of the third terminal to the first terminal, and the second transmitting unit is configured to provide a voltage of the second terminal to the output terminal,
   when the first through third clock signals respectively have a first phase, a second phase, and a first phase, the first initialization switch is configured to turn on to provide the power voltage to the third terminal and the second transmitting unit is configured to provide a voltage of the first terminal to the output terminal, and
   when the first through third clock signals respectively have a second phase, a second phase, and a first phase, the first initialization switch is configured to turn off, the first transmitting unit is configured to provide a voltage of the third terminal to the second terminal, and the second transmitting unit is configured to provide a voltage of the first terminal to the output terminal.

10. The charge pump of claim 9, wherein, in the second mode,
    when the second and third clock signals respectively have a first phase and a second phase, the second initialization switch and the third initialization switch are respectively configured to turn on and turned off to provide the power voltage to the first terminal and the second transmitting unit is configured to provide a voltage of the second terminal to the output terminal, and
    when the second and third clock signals respectively have a second phase and a first phase, the second initialization switch and the third initialization switch are respectively configured to turned off and turned on to provide the power voltage to the second terminal and the second transmitting unit is configured to provide a voltage of the first terminal to the output terminal.

11. The charge pump of claim 10, further comprising:
    an output capacitor connected between the output terminal and a ground terminal.

12. The charge pump of claim 1, wherein the first converting unit comprises:
    a first initialization switch configured to provide a ground voltage to a third terminal;
    a first pumping capacitor having one end connected to the third terminal and another end receiving the first clock signal; and
    a first transmitting unit configured to provide a voltage of the third terminal to the first terminal and the second terminal based on the second clock signal and the third clock signal.

13. The charge pump of claim 12, wherein the second converting unit comprises:
    a second pumping capacitor having one end connected to the first terminal and another end receiving the second clock signal;
    a third pumping capacitor having one end connected to the second terminal and another end receiving the third clock signal; and
    a second transmitting unit configured to provide a voltage of the first terminal and the second terminal to the output terminal.

14. The charge pump of claim 13, wherein,
    when the first through third clock signals respectively have a first phase, a first phase, and a second phase, the first initialization switch is configured to turn on to provide the ground voltage to the third terminal and the second transmitting unit is configured to provide a voltage of the second terminal to the output terminal,
    when the first through third clock signals respectively have a second phase, a first phase, and second phase, the first initialization switch is configured to turn off, the first transmitting unit is configured to provide a voltage of the third terminal to the first terminal, and the second transmitting unit is configured to provide a voltage of the second terminal to the output terminal, when the first through third clock signals respectively have a first phase, a second phase, and a first phase, the first initialization switch is configured to turned on to provide the ground voltage to the third terminal and the second transmitting unit is configured to provide a voltage of the first terminal to the output terminal, and
    when the first through third clock signals respectively have a second phase, a second phase, and a first phase, the first initialization switch is configured to turn off, the first transmitting unit is configured to provide a voltage of the third terminal to the second terminal, and the second transmitting unit is configured to provide a voltage of the first terminal to the output terminal.

15. The charge pump of claim 14, wherein the second converting unit further comprises:
    a second initialization switch and a third initialization switch configured to respectively provide a power voltage to the first terminal and the second terminal.

16. The charge pump of claim 15, wherein,
    in a first mode, the first converting unit is activated, and the second and third initialization switches are inactivated to be maintained in an off state, and
    in a second mode, the first converting unit is inactivated, and the second and third initialization switches are activated to be repeatedly turned on and off.

17. A display driving system comprising:
a display panel having a plurality of scan lines and a plurality of data lines vertically intersecting each other and switching elements and pixel electrodes arranged at intersections between the plurality of scan lines and the plurality of data lines;
a scan driving unit for providing a scan signal to the plurality of scan lines of the display panel;
a data driving unit for providing gradation information to the plurality of data lines of the display panel;
a timing controller for controlling the scan driving unit and the data driving unit; and
a charge pump providing a driving voltage to at least one of the display panel, the scan driving unit, the data driving unit, and the timing controller,
wherein the charge pump comprises:
a first converting unit configured to receive a first voltage in response to a first clock signal to generate a first pumping voltage and the first converting unit is configured to alternately output the first pumping voltage to a first terminal and a second terminal; and
a second converting unit configured to receive the first pumping voltage through the first terminal or the second terminal in response to a second clock signal and a third clock signal to generate a second pumping voltage, and the second converting unit configured to provide the second pumping voltage to an output terminal,
wherein the second converting unit is configured to provide the third voltage to the output terminal for half of a period of the second clock signal and for half of a period of the third clock signal, and
wherein the first, second, third clock signals are separate signals, and a frequency of the first clock signal is twice a frequency of the second clock signal, and the second clock signal and the third clock signal have opposite phases.

18. The display driving system of claim 17, wherein the first converting unit comprises,
a first initialization switch configured to provide a power voltage to a third terminal;
a first pumping capacitor having one end connected to the third terminal and another end receiving the first clock signal; and
a first transmitting unit configured to alternately provide a voltage of the third terminal to the first terminal or the second terminal, and wherein the second converting unit comprises,
a second pumping capacitor having one end connected to the first terminal and another end receiving the second clock signal;
a third pumping capacitor having one end connected to the second terminal and another end receiving the third clock signal; and
a second transmitting unit configured to provide a voltage of the first terminal or the second terminal to the output terminal.

* * * * *